United States Patent
Reitlingshoefer et al.

(10) Patent No.: US 7,796,652 B2
(45) Date of Patent: Sep. 14, 2010

(54) PROGRAMMABLE ASYNCHRONOUS FIRST-IN-FIRST-OUT (FIFO) STRUCTURE WITH MERGING CAPABILITY

(75) Inventors: Claus Reitlingshoefer, Kanata (CA); Dirk Pfaff, Ottawa (CA); Riccardo Badalone, Saint-Lazare (CA)

(73) Assignee: Diablo Technologies Inc., Gatineau, Quebec (CA)

( * ) Notice: Subject to any disclaimer, the term of this patent is extended or adjusted under 35 U.S.C. 154(b) by 592 days.

(21) Appl. No.: 11/790,707

(22) Filed: Apr. 27, 2007

(65) Prior Publication Data

US 2007/0258491 A1    Nov. 8, 2007

(51) Int. Cl.
*H04J 3/04* (2006.01)
(52) U.S. Cl. ..................................... 370/535
(58) Field of Classification Search ............... 370/374, 370/412, 535
See application file for complete search history.

(56) References Cited

U.S. PATENT DOCUMENTS

| | | | |
|---|---|---|---|
| 6,486,704 B1* | 11/2002 | Hearn | 326/82 |
| 6,904,475 B1* | 6/2005 | Fairman | 710/52 |
| 7,366,931 B2* | 4/2008 | Vogt | 713/320 |
| 7,389,381 B1* | 6/2008 | Co | 711/115 |

OTHER PUBLICATIONS

IDTAMB0480 Product Brief, Advanced Memory Buffer for Fully Buffered Dimm Modules, IDT, 15 Pages, Apr. 2006.*
Jedec Standard Proposal, FB-DIMM Draft Specification: Architecture and Protocol Mar. 2005.
0.94ps-rms-Jitter 0.016mm 2.5GHz Multi-Phase Generator PLL with 360 Digitally Programmable Phase Shift for 10 Gb's Serial Links, ISSCC 2005/Session 22/PLL,DLL and VCOs/22.1. 2005 IEEE Int. Solid State Circuits Conference p. 410-411. 607.

* cited by examiner

*Primary Examiner*—Frank Duong

(57) ABSTRACT

Where high speed communication between a host and memory devices is carried over serial bit lanes, memory buffers are required for converting buffering the serial bit lanes, and for converting between serial and parallel formats. In addition, jitter, wander, and skew between the bit lanes need to be accommodated. The invention discloses a programmable asynchronous FIFO with the integrated ability to convert blocks of bits from serial to parallel as well as inserting bits from a parallel bus into the serial bit stream. The invention provides very low latency and can be implemented in low power technologies.

39 Claims, 27 Drawing Sheets

*Table 1*

| | Configurations | | |
|---|---|---|---|
| | 1804 | 1806 | 1808 |
| Z=0 | 1804a | 1806b | 1808b |
| 1 | 1804a | 1806b | 1808b |
| 2 | 1804a | 1806b | 1808b |
| 3 | 1804a | 1806a | 1808a |
| 4 | 1804a* | 1806a | 1808a |
| 5 | 1804a* | 1806b | 1808b |
| 6 | 1804a* | 1806b | 1808b |
| 7 | 1804a* | 1806b | 1808b |
| 8 | 1804a* | 1806b | 1808b |
| 9 | 1804a* | 1806b | 1808b |
| 10 | 1804a* | 1806b | 1808b |
| 11 | 1804b | 1806b | 1808b |

*FIG. 20*

*Table 2*

| Z | Phase Slice 404 | 1:3 DEMUX 1502 | | | Bit Slice 1506 | | 3:1 MUX 1504 | | |
|---|---|---|---|---|---|---|---|---|---|
| | | 1512 (1518) | 1514 (1520) | 1516 (1522) | # | 1818 (cenX_pY) | 1536 (1542) | 1538 (1544) | 1540 (1546) |
| 0 | #1 | len1_p1 | | | #1 | cen2_p1 | cen1_p1 | | |
| 1 | #2 | | len1_p2 | | #1 | cen2_p2 | | cen1_p2 | |
| 2 | #3 | | | len1_p3 | #1 | cen2_p3 | | | cen1_p3 |
| 3 | #4 | len1_p4 | | | #1 | cen2_p4 | cen1_p4 | | |
| 4 | #1 | | len2_p1 | | #2 | cen3_p1 | | cen2_p1 | |
| 5 | #2 | | | len2_p2 | #2 | cen3_p2 | | | cen2_p2 |
| 6 | #3 | len2_p3 | | | #2 | cen3_p3 | cen2_p3 | | |
| 7 | #4 | | len2_p4 | | #2 | cen3_p4 | | cen2_p4 | |
| 8 | #1 | | | len3_p1 | #3 | cen1_p1 | | | cen3_p1 |
| 9 | #2 | len3_p2 | | | #3 | cen1_p2 | cen3_p2 | | |
| 10 | #3 | | len3_p3 | | #3 | cen1_p3 | | cen3_p3 | |
| 11 | #4 | | | len3_p4 | #3 | cen1_p4 | | | cen3_p4 |

*FIG. 25*

PROGRAMMABLE ASYNCHRONOUS FIRST-IN-FIRST-OUT (FIFO) STRUCTURE WITH MERGING CAPABILITY

FIELD OF THE INVENTION

The present invention relates generally to data processing systems and more particularly to high-speed data communication between hosts and memory subsystems.

BACKGROUND OF THE INVENTION

A number of architectures are available for interconnecting processors with memory devices. As a simple example, a processor may be directly connected with memory devices over a conventional memory bus. In modern high performance computer systems, memory may accessed through a memory controller, and the memory devices may be mounted on sub-assemblies (Dual In-line Memory Modules, or DIMMs) which themselves include a memory buffer in addition to the individual memory devices.

One such architecture is described in detail in a proposed JEDEC (Joint Electrical Device Engineering Council) Standard entitled FB-DIMM Draft Specification, jointly published in March 2005 by the JEDEC Solid State Technology Association, and EIA (Electrical Industries Alliance).

In this specification, a memory architecture is described which is based on very high speed serial links joining fully buffered DIMMs (FBDs) in a daisy chain arrangement to a host as illustrated in FIG. 1.

FIG. 1 shows a memory system 100, comprising a host 102 connected to a first FBD 104 over serial links 106. If the memory system contains more than one FBD (as shown in FIG. 1), the first FBD 104 is connected to a second FDB 108 over serial links 110. Additional FBDs may be chained with serial links 112 in a daisy chain fashion, until a last FBD 114 is reached. A clock buffer 116 distributes a reference clock signal to the host 102 and each of the FBDs (104, 108, ..., 114), over clock reference links 118.

Each of the FBDs (104, 108, ..., 114) may include one or more memory devices (DRAMs 120) and an advanced memory buffer (AMB) 122.

Each of the serial links (106, 110, ..., 112) comprises multiple upstream channels 124 (carrying formatted data frames towards the host 102) and downstream channels 126 (carrying formatted data frames and control information towards the last FBD 114). The "channels" are also referred to as "lanes" or "bit lanes" indicating that each data frame is transmitted in multiple time slots bit-serially, and striped across the lanes of a link, a technique commonly employed in a number of high speed transmission protocols.

Writing of memory data is accomplished by transmitting the formatted frames over the downstream channels 126 of the serial links (106, 110, ..., 112), from the host 102 through one or more AMBs 122 to the memory device (DRAM) 120 that is addressed. Reading of memory data is similarly accomplished by sending a read request from the host 102 through one or more AMBs 122 to the addressed memory device (DRAM) 120 over the downstream channels 126, and subsequently transmitting the memory data from the addressed memory device (DRAM) 120 through one or more AMBs 122 over the upstream channels 124 to the host 102.

It will be appreciated that the host 102 may communicate with a DRAM 120 on any FBD, including the last FBD 114, thus transmitting through a number of AMBs 122 in series.

The required functions of the AMB 122 are described in the aforementioned JEDEC specification. They include retrieving and regenerating the serial downstream channels 126 to the next AMB 122 in the daisy chain;
retrieving and regenerating the serial bit streams upstream to the previous AMB 122 in the daisy chain, or to the host 102 as required;
converting received downstream data to parallel for interfacing to the DRAMs 120 located on the same FBD;
converting parallel data from the DRAMs 120 located on the same FBD, to serial format for transmitting upstream; and
merging the data from the DRAMs 120 located on the same FBD, with the serial data received on the upstream channels 124 from other FBDs (located further downstream), for transmission on the upstream channels 124 toward the host 102.

Given the high speed nature of the serial links, which may be running at 8 Gbit/s, and the physical constraints of signal transmission between devices, and the delays and variations within the devices themselves, one must expect skew between the bit lanes of each link and the reference clock 118. In addition jitter and wander occurs. To combat these effects the design of the AMB 122 must include high speed clock alignment circuitry (to align the data edges of each lane with the reference clock) and First-In-First-Out (FIFO) buffers to continuously absorb jitter and wander dynamically.

It is important for the host to memory communication to minimize the delay (latency) in order to keep the overall memory access delay low. This architecture which employs serial links (requiring serial/parallel conversions) and the daisy chaining of the links through the AMBs 122 containing dejitterizing circuits with inherent delay, presents a significant challenge in meeting a low-latency objective. Even though the links run at very high speed, host performance in terms of memory access latency may be significantly affected by the round trip delay imposed on a read operation, caused by the latency imposed by the AMB circuitry.

SUMMARY OF THE INVENTION

It is therefore an objective of the present invention to develop a circuitry and a method for constructing an asynchronous FIFO with merging capability that significantly improves latency while at the same time permits keeping the power consumption of the high speed circuitry as low as possible.

According to one aspect of the invention there is provided a first-in-first-out (FIFO) circuit for buffering of a high speed input bit stream of data bits (din_s), including:
  a 1:M demultiplexer for generating M lower speed serial input data streams (din_p1 to din_pM), each lower speed serial input data stream carrying a distinct first subset of the data bits;
  a first plurality M of 1:N demultiplexers, each for generating N first data bit streams each first data bit stream carrying a distinct second subset of the first subset of the data bits;
  a second plurality of M times N bit slices, each bit slice forwarding the first data bit streams into second data bit streams;
  a third plurality M of N:1 multiplexers, each for combining N second data bit streams of the second subset into a (lower speed) serial output bit stream (dop_p1 to dop_pM); and
  an M:1 multiplexer for combining the (lower speed) serial output bit streams into a high speed output bit stream (dop_s).

In the embodiment of the present invention M=4 and N=3. The FIFO further comprises a timing circuit (408) that provides a multi phase receive clock signal (rck_p1 to rck_pM); and where the 1:M demultiplexer comprises a set of M edge triggered flip flops, each being clocked by a phase of the multi phase receive clock signal to periodically store one bit from the high speed input bit stream.

The timing circuit further provides a multi phase "latch enable" signal (lenX_pY); and where the 1:N demultiplexer comprises a set of N storage elements, each being enabled by a phase of the multi phase "latch enable" signal to periodically store one bit from one the lower speed serial input data streams. Conveniently, in the FIFO described above, the storage elements are transparent latches (1512).

The timing circuit further provides a multi phase "clock enable" signal (cenX_pY); and where the N:1 multiplexer comprises a set of N transmission gates (1536), each being enabled by a phase of the "clock enable" signal to periodically pass one data bit of the second subset into the (lower speed) serial output bit stream. The timing circuit further provides a multi phase transmit clock signal (tck_pM) from which the multi phase "clock enable" signal is generated.

In the FIFO described above, the N:1 multiplexer further comprises a retiming flip flop (1550) for retiming the (lower speed) serial output bit stream, the retiming flip flop being clocked by a phase of the multi phase transmit clock signal. The multi phase transmit clock signal is generated from a reference clock of a frequency that is related to the bit rate of the high speed input bit stream by a ratio of 1:R. In the embodiment of the invention, the ratio R equals 1:2. Each bit slice comprises a demux data alignment circuit (1804) for the purpose of buffering the first data bit stream and outputting the buffered data bit stream on a Data Extraction highway (dData). The demux data alignment circuit comprises one or more first clocked storage devices to insert a delay from the first data bit stream to the output of the demux data alignment circuit. The first clocked storage devices in each bit slice are clocked individually with a phase of the multi phase "clock enable" signal chosen such that a parallel word of M times N bits is periodically output to the Data Extraction highway.

In the FIFO described above, each bit slice further comprises:
a 2:1 multiplexer (1802);
a merge data alignment circuit (1806) having a merge data input and an aligned merge data output;
and a merge enable alignment circuit (1808) having a merge enable input and an aligned merge enable output;
where the 2:1 multiplexer selectively, under control of the aligned merge enable output, forwards either the first data bit stream or the aligned merge data output to the second data bit stream.

The merge data input receives a data bit from a Data Insertion highway (mData) and the merge enable input receives control bit from a Merge Control Highway (mEn). The merge data alignment circuit and the merge enable alignment circuit in each bit slice each comprise one or more second clocked storage devices to insert a delay between their respective inputs and outputs. The last of the second clocked storage devices in each bit slice are clocked individually with a phase of the multi phase "clock enable" signal chosen such that a parallel data word of M times N bits that is periodically input to the M times N merge data alignment circuits from the Data Insertion highway and the Merge Control Highway become substantially aligned with the first data bit streams.

According to another aspect of the invention there is provided a memory buffer serving a plurality C of serial bit lanes including a plurality C of channel slices (200), each channel slice serving one serial bit lane and comprising a first-in-first-out (FIFO) circuit for buffering of a high speed input bit stream of data bits (din_s), including:
a 1:M demultiplexer for generating M lower speed serial input data streams (din_p1 to din_pM, each lower speed serial input data stream carrying a distinct first subset of the data bits;
a first plurality M of 1:N demultiplexers, each for generating N first data bit streams each first data bit stream carrying a distinct second subset of the first subset of the data bits;
a second plurality of M times N bit slices, each bit slice forwarding the first data bit streams into second data bit streams;
a third plurality M of N:1 multiplexers, each for combining N second data bit streams of the second subset into a (lower speed) serial output bit stream (dop_p1 to dop_pM); and
an M:1 multiplexer for combining the (lower speed) serial output bit streams into a high speed output bit stream (dop_s).

In the memory buffer described above, the FIFO further comprises a timing circuit (408) that provides a multi phase receive clock signal (rck_p1 to rck_pM) and a multi phase "latch enable" signal (lenX_pY);
and where the 1:M demultiplexer comprises a set of M edge triggered flip flops, each being clocked by a phase of the multi phase receive clock signal to periodically store one bit from the high speed input bit stream;
and where the 1:N demultiplexer comprises a set of N storage elements, each being enabled by a phase of the multi phase "latch enable" signal to periodically store one bit from one the lower speed serial input data streams.

The timing circuit in the FIFO of the memory buffer further provides a multi phase "clock enable" signal (cenX_pY), a multi phase transmit clock signal (tck_pM) from which the multi phase "clock enable" signal is generated, and in which the multi phase transmit clock signal is generated from a reference clock of a frequency that is related to the bit rate of the high speed input bit stream by a ratio of 1:R;
and where the N:1 multiplexer comprises a set of N transmission gates (1536), each being enabled by a phase of the "clock enable" signal to periodically pass one data bit of the second subset into the (lower speed) serial output bit stream.

Each Channel Slice further comprises: (FIG. 2)
a Data Extraction highway (dData);
a Data Insertion highway (mData); and
a Merge Control Highway (mEn), and in which each bit slice comprises:
a demux data alignment circuit (1804) for the purpose of buffering the first data bit stream and outputting it on the Data Extraction highway;
a 2:1 multiplexer (1802);
a merge data alignment circuit (1806) having a merge data input connected to the Data Insertion highway and an aligned merge data output;
and
a merge enable alignment circuit (1808) having a merge enable input connected to the Merge Control highway and an aligned merge enable output where the 2:1 multiplexer selectively, under control of the aligned merge enable output, forwards either the first data bit stream or the aligned merge data output to the second data bit stream.

The demux data alignment circuit comprises one or more first clocked storage devices to insert a delay from the first data bit stream to the output of the demux data alignment circuit, the first clocked storage devices in each bit slice being clocked individually with a phase of the multi phase "clock enable" signal chosen such that a parallel word of M times N bits is periodically output to the Data Extraction highway.

The merge data alignment circuit and the merge enable alignment circuit in each bit slice each comprise one or more second clocked storage devices to insert a delay between their respective inputs and outputs, the second clocked storage devices in each bit slice being clocked individually with a phase of the multi phase "clock enable" signal chosen such that a parallel data word of M times N bits that is periodically input to the M times N merge data alignment circuits from the Data Insertion highway become substantially aligned with the first data bit streams.

According to yet another aspect of the invention there is provided a method for buffering of a high speed input bit stream of data bits (din_s), including:
- a first step of demultiplexing the input bit stream into M lower speed serial input data streams (din_p1 to din_pM), each lower speed serial input data stream carrying a distinct first subset of the data bits;
- a second step of demultiplexing each of the M lower speed serial input data streams into N first data bit stream each first data bit stream carrying a distinct second subset of the first subset of the data bits;
- a step of bit slice processing comprising the step of forwarding the first data bit stream into the second data bit stream;
- a first step of combining each group of N second data bit streams of the second subset into a serial output bit stream (dop_p1 to dop_pM); and
- a second step of combining the (lower speed) serial output bit streams into a high speed output bit stream (dop_s).

In the embodiment of the present invention, M=4 and N=3.

The first demultiplexing step further including:
- a step of generating a multi phase receive clock signal (rck_p1 to rck_pM); and
- a step of periodically storing one bit from the input bit stream into one of M edge triggered flip flops, each flip flop being clocked by a phase of the multi phase receive clock signal.

The second demultiplexing step further including:
- a step of generating a multi phase "latch enable" signal (lenX_pY); and
- a step of periodically storing one bit from each lower speed serial input data stream into one of N storage elements, each storage element being enabled by a phase of the multi phase "latch enable" signal.

The first combining step further including:
- a step of generating a multi phase "clock enable" signal (cenX_pY); and
- a step of periodically passing one bit data bit of the second subset through a transmission gate into the (lower speed) serial output data stream, each transmission gate being enabled by a phase of the multi phase "clock enable" signal.

The step of generating a multi phase "clock enable" including the step of generating a multi phase transmit clock signal (tck_pM) as the source of the multi phase "clock enable" signal. The first combining step further including a step of retiming the (lower speed) serial output data stream in a retiming flip flop that is clocked by a phase of a multi phase transmit clock signal. The step of generating a multi phase transmit clock signal (tck_pM) includes a step of synchronizing the multi phase transmit clock signal with a reference clock of a frequency that is related to the bit rate of the high speed input bit stream by a ratio of 1:R. In the embodiment of the invention, the ratio R equals 1:2.

The step of bit slice processing further comprising the steps of:
- buffering the first data bit stream in an alignment buffer; and
- outputting the buffered data bit stream on a Data Extraction highway (dData).

The step of buffering comprising one or more steps of delaying the first data bit stream.

The first step of delaying includes choosing a phase of the multi phase "clock enable" signal such that a parallel word of M times N bits is periodically output to the Data Extraction highway.

The step of bit slice processing further comprising the steps of:
- aligning a merged data bit;
- aligning a merge enable bit; and
- if the aligned merge enable bit is "0" forwarding the first data bit stream; otherwise forwarding the aligned merge data bit to the second data bit stream.

In the method described above, the merged data bit is received from a Data Insertion highway (mData) and the merge enable bit is received from a Merge Control Highway (mEn).

Conveniently, each step of aligning comprises one or more steps of delaying. The last of the one or more steps of delaying includes individually choosing a phase of the multi phase "clock enable" signal such that parallel data words of M times N bits (comprising the merged data bits and the merge enable bits) that are periodically input from the Data Insertion highway and the Merge Control highway become substantially aligned with the first data bit streams.

Thus, an improved first-in-first-out (FIFO) circuit for buffering of a high speed input bit stream of data bits, a memory buffer comprising the FIFO, and a method for buffering a high speed input bit stream of data bits have been provided.

BRIEF DESCRIPTION OF THE DRAWINGS

An embodiment of the invention will now be described, by way of example, with reference to the accompanying drawings in which:

FIG. 20 shows in a Table 1 the relationship between the index "Z" and the configuration choices for the Alignment blocks 1804, 1806, and 1808 of FIGS. 18 and 19;

FIG. 25 shows in a Table 2 a summary of unique signal assignments in each Phase Slice 404 of FIG. 15 with respect to a bit index "Z";

DETAILED DESCRIPTION OF THE EMBODIMENTS OF THE INVENTION

Figure 1:
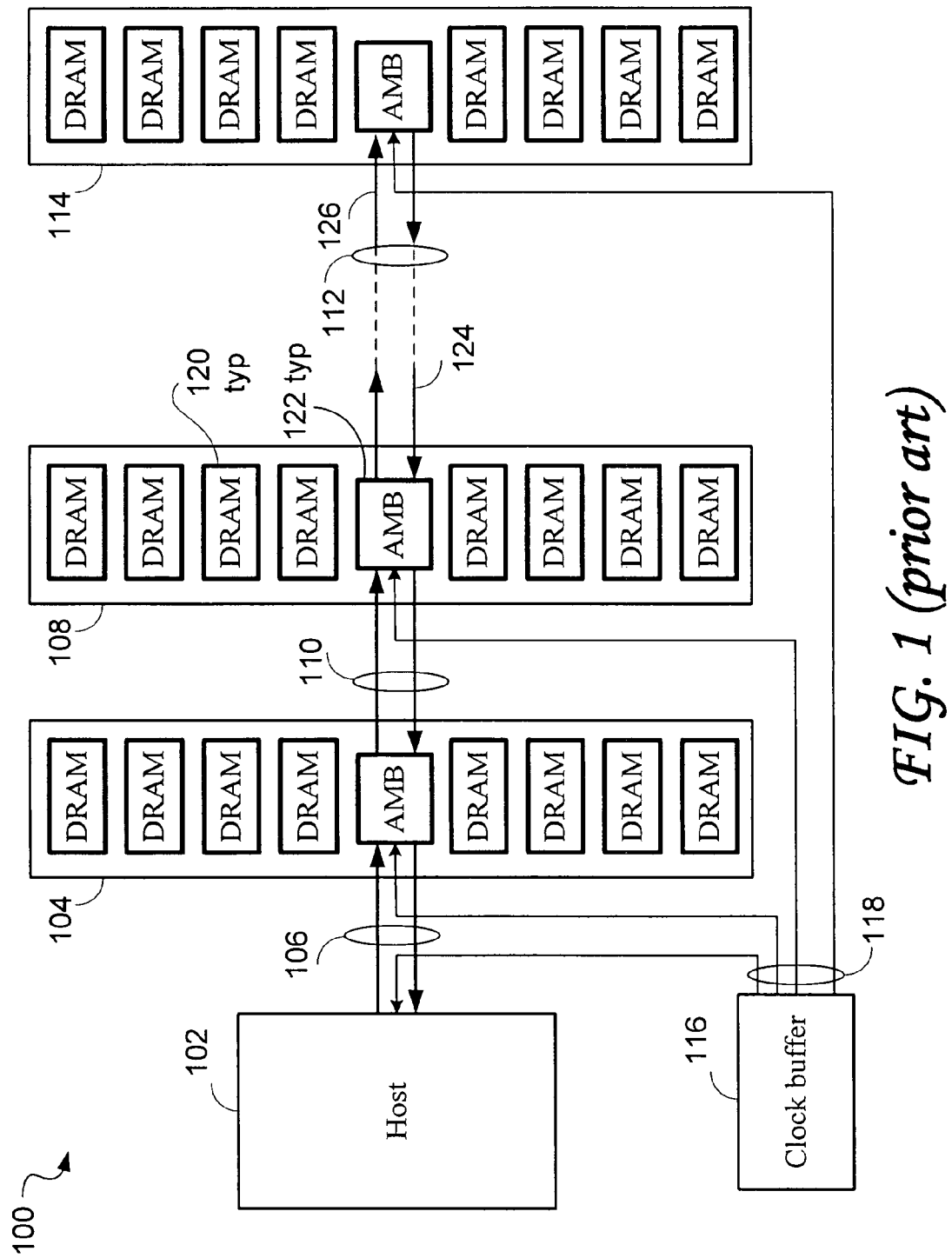
FIG. 1 shows a memory system 100 of the prior art.
Figure 2:
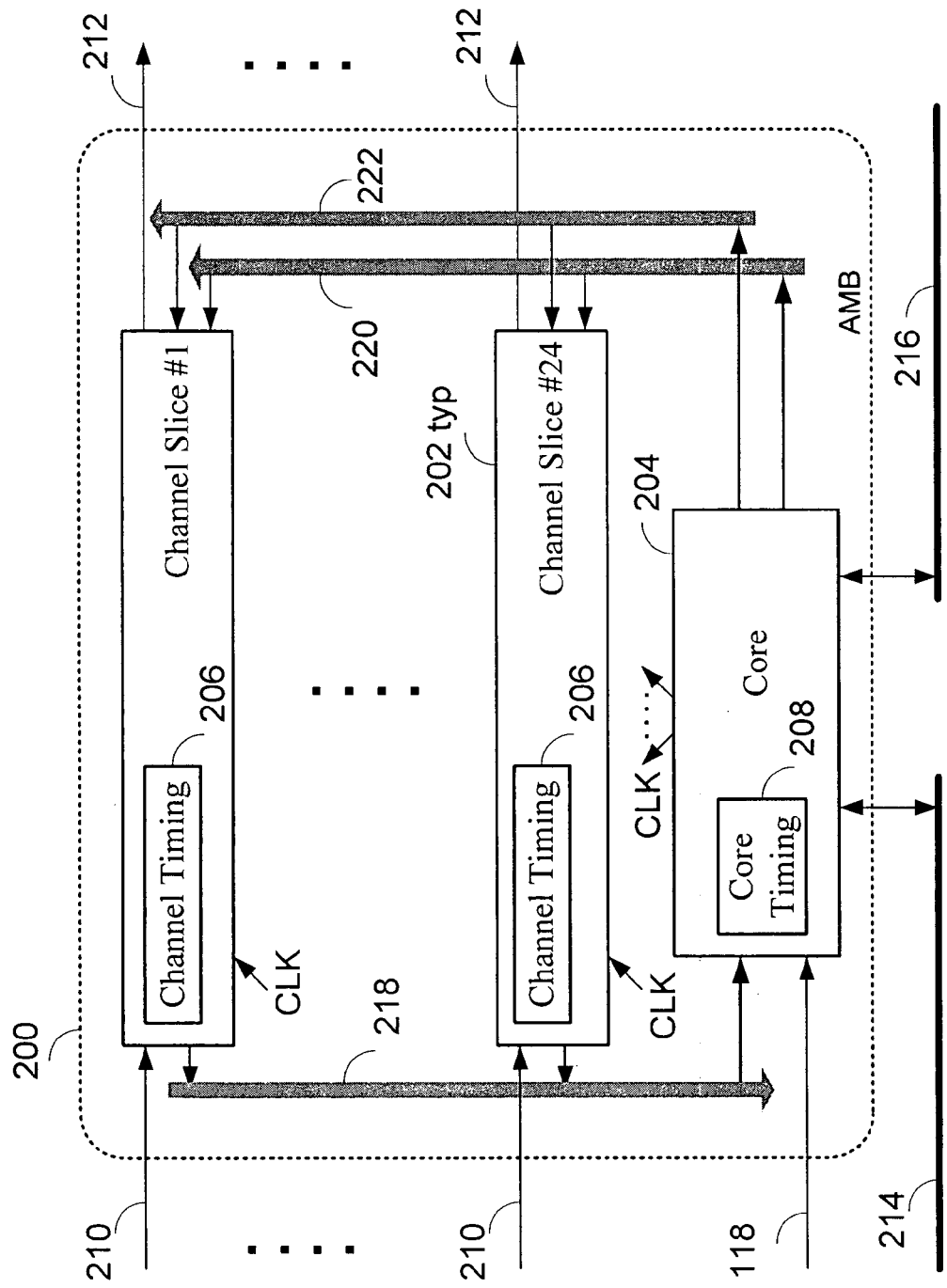
FIG. 2 shows a block diagram of a typical Advanced Memory Buffer (AMB) 200 according to an embodiment of the invention.

FIG. 2 shows a block diagram of a typical Advanced Memory Buffer (AMB) 200 according to an embodiment of the invention. An AMB according to the afore-mentioned JEDEC specification may provide buffering for up to ten upstream channels 124 and up to fourteen downstream channels 126 (see FIG. 1). Accordingly, the AMB 200 includes twenty-four (10+14) buffer circuits termed "Channel Slice #1" to "Channel Slice #24" (202 typ), and a "Core" 204. The buffer functionality required in the downstream channels 126 is a subset of the buffer functionality required in the upstream channels 124, and a single design for all twenty-four Channel Slices 202 is presented here.

The Channel Slices 202 of the AMB 200 include innovative data buffering circuitry and individual timing circuitry "Channel Timing" 206.

The Core 204 of the AMB 200 includes common control functions and interfaces to the DRAMs 120 that are located on the subject FBD. The Core 204 further includes common clock circuitry "Core Timing" 208.

High speed serial I/O of the AMB 200 includes twenty-four high speed serial inputs 210 and corresponding twenty-four high speed serial outputs 212, one input 210 and one output 212 on each of the twenty-four Channel Slices 202.

The Core 204 receives the common reference clock 118 (FIG. 1), and interfaces to two banks of DRAMS 120 over two DRAM interface busses 214 and 216.

Internal to the AMB 200, the Core 204 distributes individual clock references CLK to the Channel Slices 202. The Core 204 is further connected to each of the Channel Slices 202 over a Data Extraction highway 218, a Data Insertion Highway 220, and a Merge Control Highway 222.

The Channel Slice 202 of the AMB 200 includes three main modes of operation:

(A) Serial buffering, in which each Channel Slice 202 forwards the serial bit stream received on its high speed serial input 210 to its high speed serial output 212, while absorbing jitter and wander;

(B) Data Extraction from the serial bit stream received on its high speed serial input 210, the data being destined for the core 208, in which the data are aligned and presented in parallel form over the Data Extraction highway 218; and (C) Data Insertion into the serial bit stream to be transmitted on the high speed serial output 212, the data being received from the core in parallel form over the Data Insertion Highway 220. In this mode, data insertion is under the control of the Merge Control Highway 222 from the Core 204.

These main modes of operation are required to meet the functionality of the AMB 200, as specified in the afore-mentioned JEDEC specification.

Figure 3:
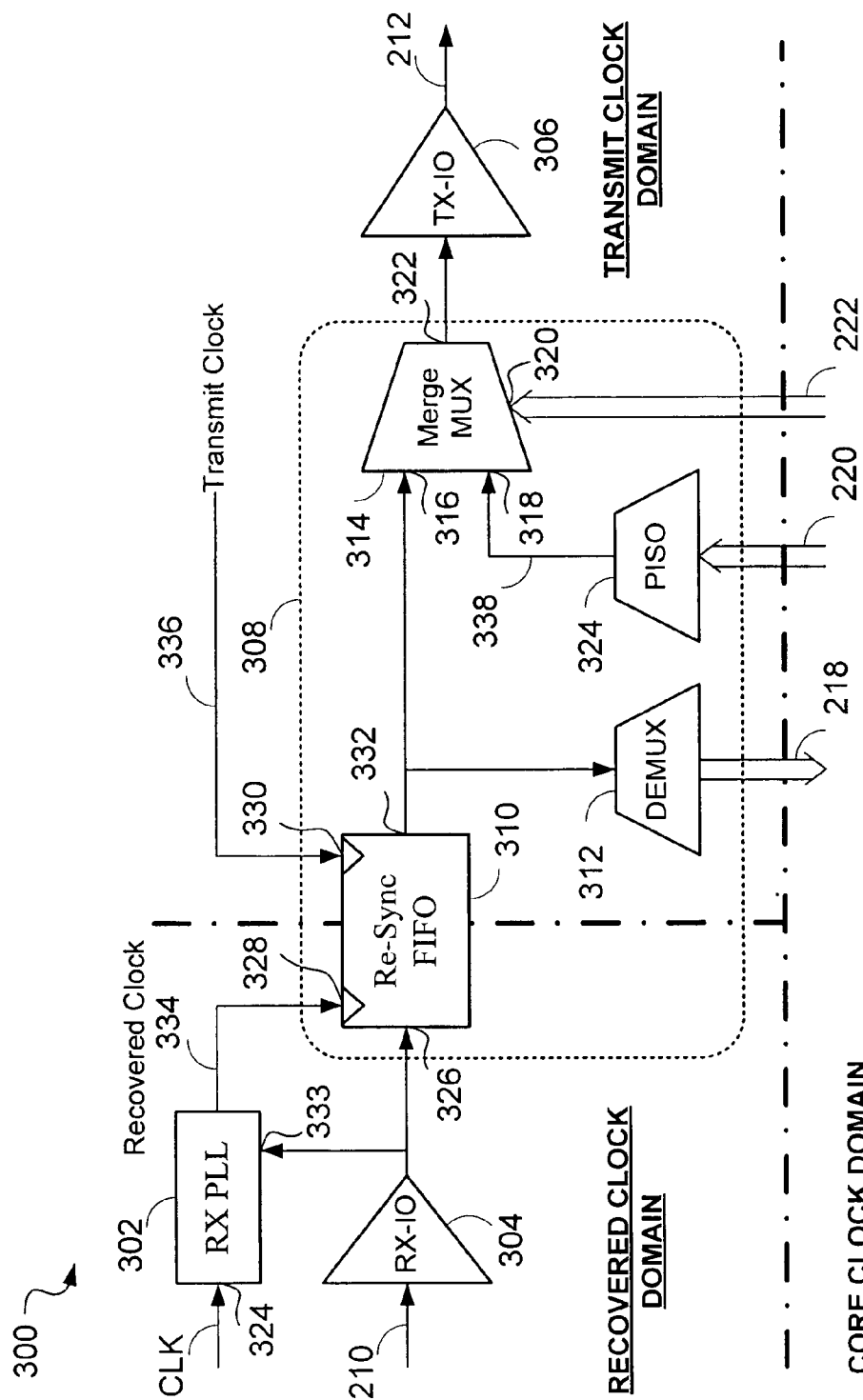
FIG. 3 shows a block diagram of a Generic Implementation 300 of the Channel Slice 202 of the AMB 200 of FIG. 2.

FIG. 3 shows a block diagram of a Generic Implementation 300 of the Channel Slice 202, to further explain the operation of the Channel Slice 202. The Generic Implementation 300 may be divided into three clock domains, a Recovered Clock Domain, a Transmit Clock Domain, and a Core Clock Domain.

The Generic Implementation 300 comprises a Receive (RX) PLL 302 and a Receive (RX) I/O driver 304 within the Recovered Clock Domain; a Transmit (TX) I/O driver 306 in the Transmit Clock Domain; and an Asynchronous FIFO with Merge circuit 308 straddling all three clock domains.

The Asynchronous FIFO with Merge circuit 308 includes a Re-Sync FIFO 310; a Demultiplexer (Demux) 312; a Merging Multiplexer (Merge Mux) 314 having two data inputs (316 and 318), a control input 320, and an output 322; and a Parallel-In-Serial-Out (PISO) circuit 324.

The Generic Implementation 300 provides inputs and outputs corresponding to those of the Channel Slice 202 (FIG. 2), shown using the same reference numerals:

the high speed serial input 210, connected to the input of the RX-I/O driver 304;

the high speed serial output 212, connected to the output of the TX-I/O driver 306;

the Data Extraction highway 218, connected to the output of the Demux 312;

the Data Insertion Highway 220, connected to the input of the PISO 324;

the Merge Control Highway 222, connected to the control input 320 of the Merge Mux 314; and the reference clock CLK, connected to a reference input 324 of the RX PLL 302.

The Re-Sync FIFO 310 has a data input 326 that is connected to the output of the RX I/O driver 304; a write clock input 328; a read clock input 330; and a data output 332.

The output of the RX-I/O driver 304 is connected to both, the data input 326 of the Re-Sync FIFO 310 and a signal input 333 of the RX PLL 302. The output of the RX PLL 302 is a Recovered Clock 334 driving the write clock input 328 of the Re-Sync FIFO 310.

The read clock input 330 of the Re-Sync FIFO 310 is driven by a Transmit Clock 336 which may be derived from the reference clock CLK or other source, not shown in FIG. 3.

The serial bit stream received externally on the high speed serial input 210 is buffered by the RX-I/O driver 304 for distribution to the RX PLL 302 and the Re-Sync FIFO 310. The RX PLL 302, using the received signal (signal input 333) and the reference clock CLK, generates a recovered clock 334 that has the frequency of the reference clock CLK, but which tracks the jitter/wander of the signal from the high speed serial input 210.

The Re-Sync FIFO 310, using the Recovered Clock 334 (the write clock input 328), stores the received signal (data input 326). Using the Transmit Clock 336 (the read clock input 330), a dejitterized data stream is then sent from the Re-Sync FIFO 310 (the data output 332) to the data input 316 of the Merge Mux 314.

In the Serial Buffering mode, see above, the dejitterized data stream is passed transparently through the Merge Mux 314 and the TX-I/O driver 306 to the high speed serial output 212, at the rate determined by the Transmit Clock.

In the Data Extraction mode, the dejitterized data stream from the Re-Sync FIFO 310 is demultiplexed (converted to parallel data words) in the DEMUX 312 for inputting to the Core 204 (see FIG. 2) over the Data Extraction highway 218. Generally speaking, the Core 204 would be clocked at a lower clock rate than the high speed serial data stream. The frequency of the Core Clock 208 may be related to the common reference clock CLK, and also to the Transmit Clock 336, by a fixed ratio.

In the Data Insertion mode, parallel data (data words) received from the Core 204 over the Data Insertion Highway 220 is serialized in the PISO 324 (a Core Bit Stream 338) and input to the Merge Mux 314 (data input 318). When a data selection signal from the Merge Control Highway 222 from the Core 204, at the control input 320 of the Merge Mux 314, is asserted the serialized bit stream from the PISO 324 is passed through the Merge Mux 314 and the TX-I/O driver 306 to the high speed serial output 212, at the rate determined by the Transmit Clock.

In general, the Core Clock 208 may not be locked to the Transmit Clock 336. Thus the two serial bit streams (from the Re-Sync FIFO 310, and from the PISO 324) may not need to be at exactly the same bit rate, or be aligned on "word" boundaries or "bit" boundaries. In the simplest scenario, the Merge Control Highway 222 from the Core 204 would be a single control line to select one or the other bit stream.

Data from the Core 204 may be transmitted in the place of the incoming high speed data stream (input 210). By using the Merge Mux 314, it is possible to select the output data (high speed output 212) to represent data from two possible sources, namely, the original incoming data stream 210, or the Core Data Stream 338 originating from the Core 204 via the PISO 324. A merge control signal (from the Merge Control Highway 222), which is driven by the Core 204, is used to select between the two data streams. The Merge MUX 314 produces a merged data stream which is buffered by the TX-I/O 306, and output from the circuit 300, typically to the exterior of the device (the AMB 122, FIG. 1) that is used to implement the circuit 300, chaining to the next circuit or device (AMB 122 or host 102).

The Re-Sync FIFO 310, Merge Mux 314, PISO 324, and DMUX 312, form a collection of blocks (Asynchronous FIFO with Merge circuit 308) that are capable of consuming a considerable amount of power and represent areas of very high design risk. FIFO mechanisms are typically very rigid and represent very high latency contributors. Furthermore, high-speed FIFO mechanisms tend to consume a lot of power because they use static memory cells. Also, the latency of a FIFO is directly proportional to its depth, but is also greatly affected by the data rate.

Running a FIFO mechanism at a slower rate can typically conserve power, but will significantly increase latency. Switching between two serial bit streams, which are based on two separate clock domains can be difficult to achieve and will likely not work if the transmit and core clock domains are not properly synchronized.

By combining the functions of the Re-Sync FIFO 310, Merge Mux 314, PISO 324, and DMUX 312, into a single block that will reduce power and latency simultaneously, implementation may be significantly eased while increasing the timing margins. The implementation of a Channel Slice (representing the Channel Slice 202 of the AMB 200 of FIG. 2) according to the invention, which includes the functionality of the Asynchronous FIFO with Merge circuit 308 will now be described in detail.

Figure 4:
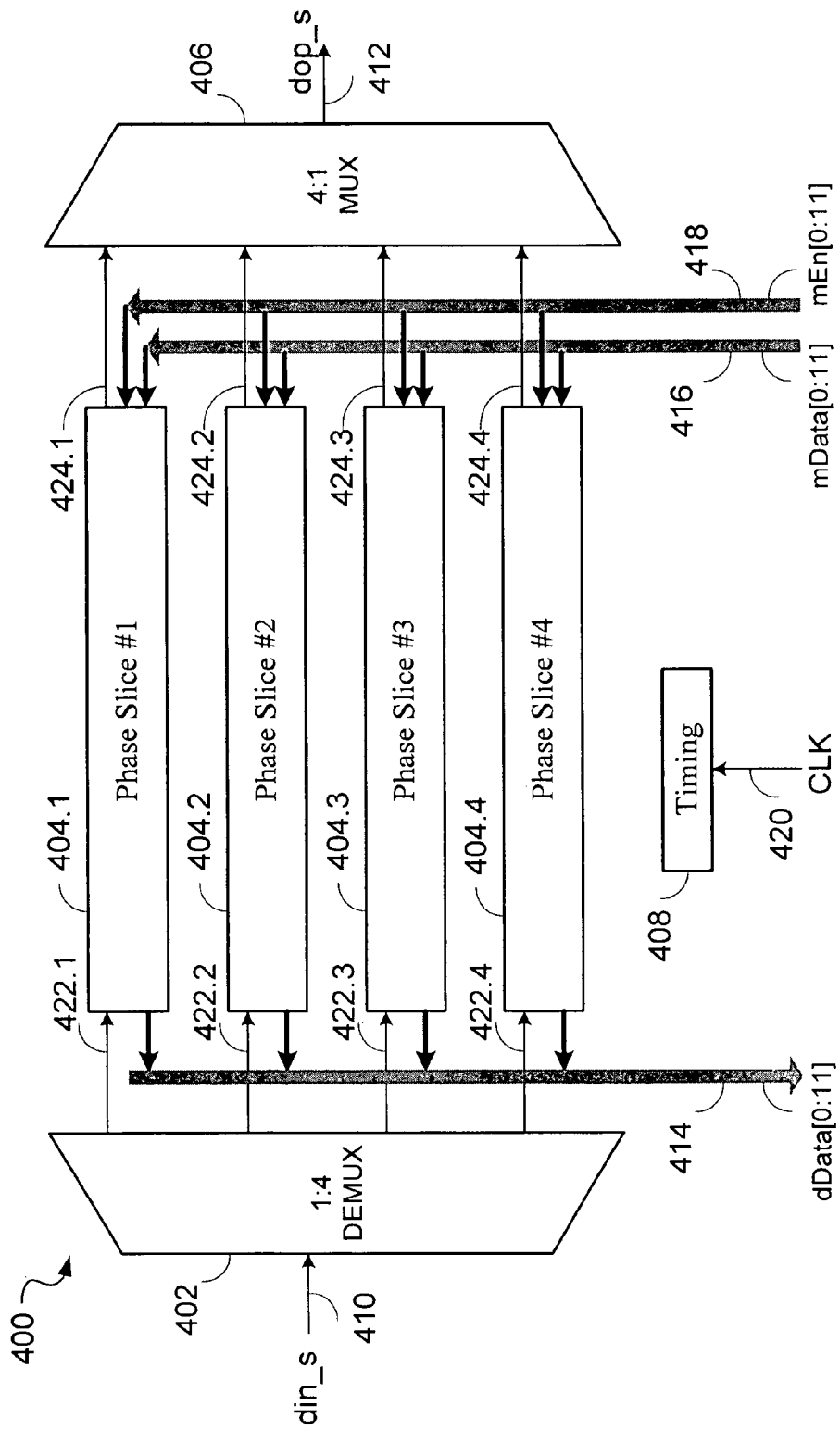
FIG. 4 is a top-level block diagram of a Channel Slice 400 according to an embodiment of the invention.

FIG. 4 is a top-level block diagram of a Channel Slice 400 according to an embodiment of the invention.

The Channel Slice 400 comprises a 1:4 DEMUX stage 402, four Phase Slices 404.1 through 404.4 (Phase Slice #1 to #4), a 4:1 MUX stage 406, and a Timing block 408 (representing the Channel Timing block 206 of the AMB 200 of FIG. 2).

External inputs and outputs of the Channel Slice 400, corresponding to the external inputs and outputs of the typical Channel Slice 202 are:

a high speed serial input 410 (viz. 210);
a high speed serial output 412 (viz. 212);
a Data Extraction highway 414 (viz. 218);
a Data Insertion Highway 416 (viz. 220);
a Merge Control Highway 418 (viz. 222); and
a reference clock 420 (viz. CLK).

The serial input signal (410) carries a formatted high speed input bit stream "din_s" which may be divided into 12-bit words. The functionality of the Channel Slice 400 is based on a hierarchical bit-wise demultiplexing in the 1:4 DEMUX 402 of the serial bit stream din_s into four (lower speed) serial input data streams din_p1 to din_p4 at "phase inputs" 422.1 through 422.4, which form the inputs of the Phase Slices 404.1 through 404.4 respectively.

Within each Phase Slice 404.$i$, the input phase input 422.$i$ is then further demultiplexed into three individual data bit streams, as will be described in detail below.

After processing, which includes 3:1 re-multiplexing of three individual bit streams, each Phase Slice 404.$i$ generates a serial output stream, the "phase outputs" 424.$i$ ($i$=1 to 4). The four phase outputs 424.1 through 424.4 are input into the 4:1 MUX stage 406, for re-multiplexing into a single high speed output bit stream dop_s to be sent out on the high speed serial output 412.

The choice of a two-stage hierarchy of demultiplexing and re-multiplexing in 1:M and 1:N stages to achieve an overall 1:(M×N) effect, M=4 and N=3, M×N=12, was carefully made after taking into account requirements (maximum amount of jitter/wander expected), the possibility of dividing data frames into 12-bit words, and the available technologies for implementing the high-speed circuitry (CML) and the lower speed circuitry (C-MOS) in order to keep the power consumption of the entire circuit low. Although the embodiment of the invention is designed to address the requirements of an AMB according to the present JEDEC specification, the scope of the invention nevertheless embraces other applications as well, including different data word size, different demux and mux ratio, single and multistage stage demux and mux hierarchy, and different technology choice.

Figure 5:
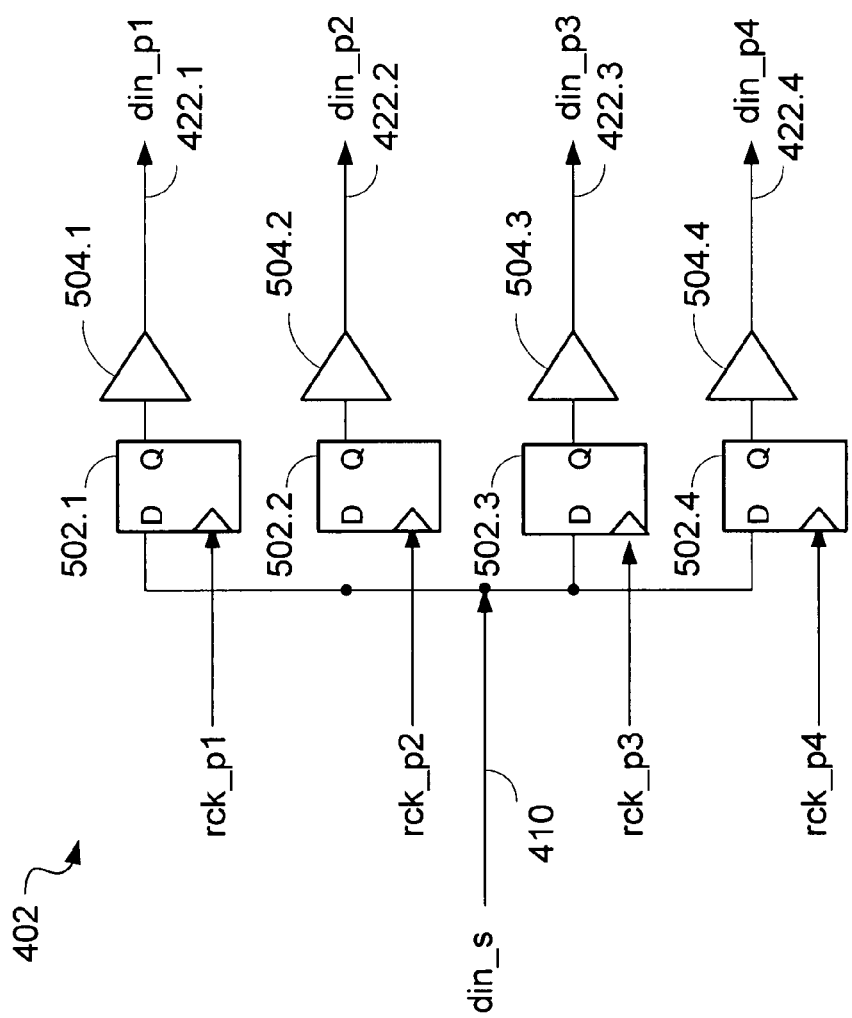
FIG. 5 shows details of an implementation of the 1:4 DEMUX 402 stage of the Channel Slice 400 of FIG. 4.

FIG. 5 shows further details of an implementation of the 1:4 DEMUX 402 stage. The 1:4 DEMUX 402 includes four high speed sampling structures (D flip-flops) 502.1 through 502.4 each having a "D" input, a clock input, and a "Q" output. The 1:4 DEMUX 402 further includes four output buffers 504.1 through 504.4. The high speed serial input 410 (see also FIG. 4) is connected to the "D" input of each of the sampling structures 502.$i$ ($i$=1 to 4). The "Q" output of each of the sampling structures 502.$i$ ($i$=1 to 4) is buffered through the respective output buffers 504.$i$ to generate the corresponding four phase inputs 422.$i$. The phase input signals are also referred to as (lower speed) serial input data streams "din_p1" to "din_p4".

Figure 7:
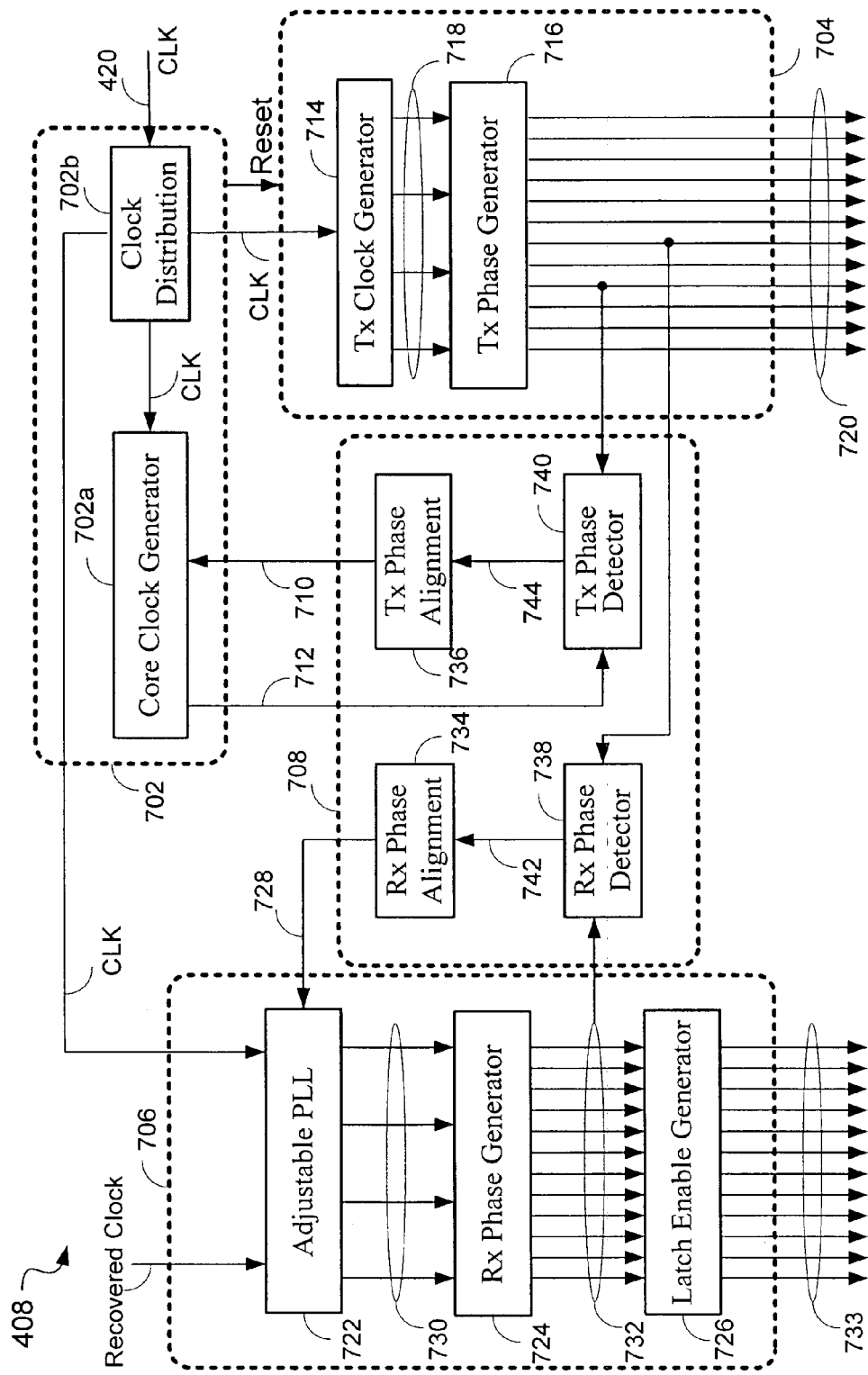
FIG. 7 shows a top-level block diagram of the Timing block 408 of the Channel Slice 400 of FIG. 4.

The clock inputs of the four sampling structures 502.$i$ ($i$=1 to 4) are driven by respective four receive clock signals rck_p1 to rck_p4. The receive clock signals are generated in the Timing block 408, described below (FIG. 7).

Figure 6:
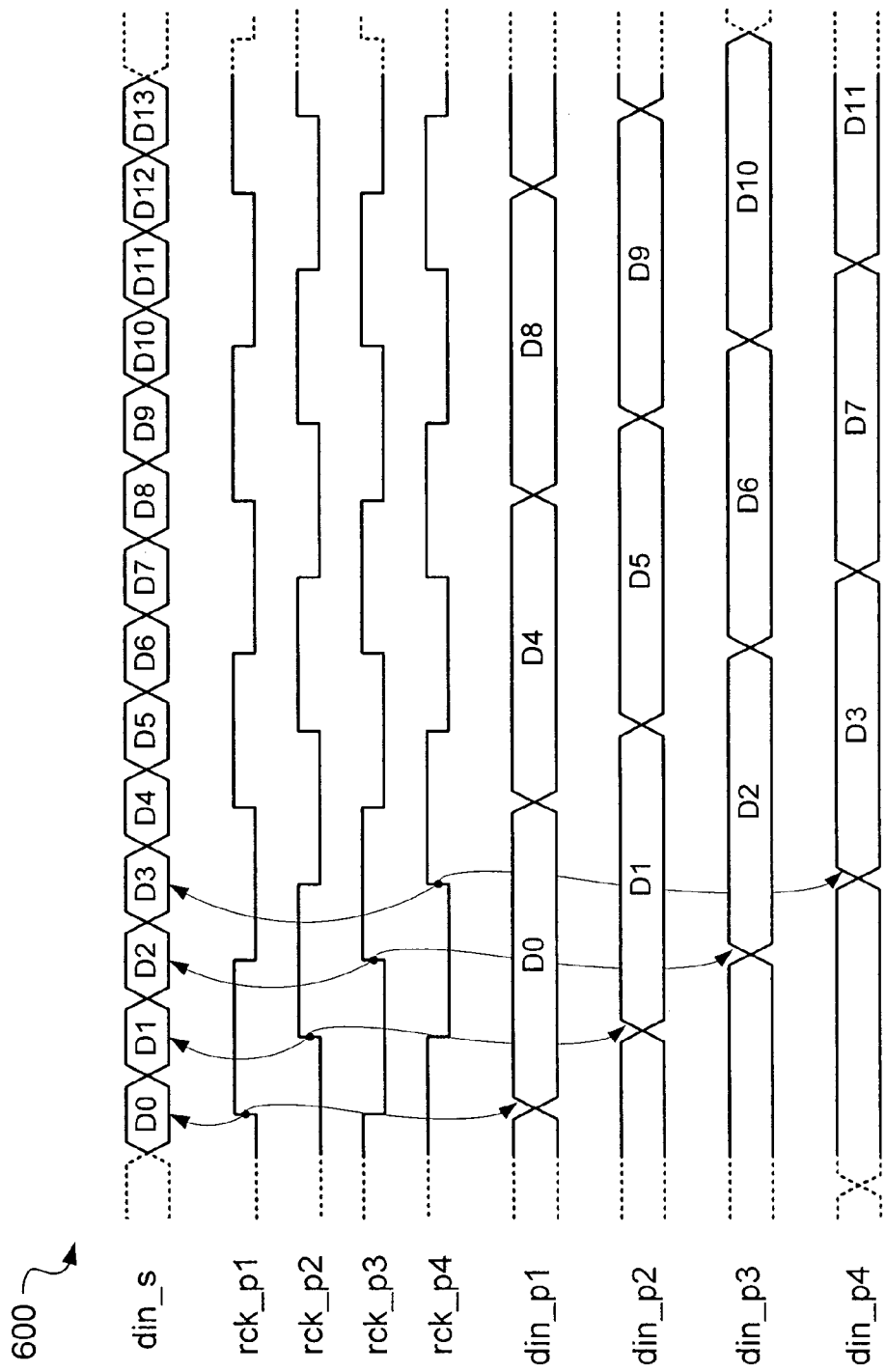
FIG. 6 shows a timing diagram 600 illustrating the timing relationship between the inputs, outputs, and clock signals of the 1:4 DEMUX 402 of FIG. 5.

FIG. 6 shows a timing diagram 600 illustrating the timing relationship between the inputs, outputs, and clock signals of the 1:4 DEMUX 402.

The timing diagram 600 shows the received high speed data signal "din_s" (carried on the high speed serial input 410) with bit values D0, D1, D2 etc.; the receive clock signals rck_p1 to rck_p4 which are clocks that run at a rate of one fourth the bit rate of the high speed data signal 602, and have (positive) edges that are aligned with the centers of bit periods of the data signal; and (lower speed) serial input data streams "din_p1" to "din_p4" representing the four outputs of the 1:4 DEMUX 402 (representing the four phase inputs 422.$i$). The phases of the of the receive clock signals rck_p1 to rck_p4 are shifted with respect to each other by the bit period of the high speed data signal. As a result, the (lower speed) serial input data stream "din_p1" to "din_p4" of the 1:4 DEMUX 402 (the phase inputs 422.$i$) are data streams running at one fourth the original bit rate, each carrying every fourth bit of the received high speed data signal 602, starting at D0, D1 etc. respectively. In effect, each bit has been stretched to 4 times its original length, but because the bits (din_p1 to din_p4) are staggered, they can each be accessed without incurring additional delay (beyond the sampling delay, typically less than 1 UI).

Returning now to the description of the Channel Slice 400 of FIG. 4.

The 4:1 MUX stage 406 is not further described in detail as it may be easily constructed using conventional high-speed logic gates and resampling flip-flops, clocked by the positive and negative edges respectively of the transmit clock 336, see FIG. 3.

In the Data Extraction mode (see above), twelve-bit parallel demultiplexed data words "dData[11:0]" are presented by the Channel Slice 400 to the Core 204 over the Data Extraction highway 414. Each of the Phase Slices 404.1 to 404.4 contribute three (3) bits of the dData[11:0], namely:

dData[0], dData[4], dData[8] from the Phase Slice #1 (404.1);
dData[1], dData[5], dData[9] from the Phase Slice #2 (404.2);
dData[2], dData[6], dData[10] from the Phase Slice #3 (404.3); and
dData[3], dData[7], dData[11] from the Phase Slice #4 (404.4).

In the Data Insertion mode, twelve-bit parallel merged data words "mData[11:0]" are presented by the Core 204 to the Channel Slice 400 over the Data Insertion highway 416. Each of the Phase Slices 404.1 to 404.4 receive three (3) bits of the mData[11:0], namely:

mData[0], mData[4], mData[8] from the Phase Slice #1 (404.1);
mData[1], mData[5], mData[9] from the Phase Slice #2 (404.2);
mData[2], mData[6], mData[10] from the Phase Slice #3 (404.3); and
mData[3], mData[7], mData[11] from the Phase Slice #4 (404.4).

Further in the Data Insertion mode, twelve-bit parallel merge-enable control words "mEn[11:0]" are presented by the Core 204 to the Channel Slice 400 over the Merge Control Highway 418. Each of the Phase Slices 404.1 to 404.4 receive three (3) bits of the mEn[11:0], namely:

mEn[0], mEn[4], mEn[8] from the Phase Slice #1 (404.1);
mEn[1], mEn[5], mEn[9] from the Phase Slice #2 (404.2);
mEn[2], mEn[6], mEn[10] from the Phase Slice #3 (404.3); and
mEn[3], mEn[7], mEn[11] from the Phase Slice #4 (404.4).

The Phase Slices 404.1 to 404.4 have a common structure, each comprising three bit slices (see FIG. 15 below) but differ in their use of the timing signals that are provided by the Timing block 408.

FIG. 7 shows a top-level block diagram of the Timing block 408, including a number of timing circuits that will be expanded in subsequent figures below.

Each Channel Slice 400 (viz. the 24 typical Channel Slices 202, FIG. 2) includes a Timing block 408 (i.e. Channel Timing 206) which is driven by the common reference clock CLK distributed by the Core 204. But timing in each Channel Slice is independently and dynamically adjusted to track the jitter/wander of the respective high speed input signal 210.

A purpose of the Timing block 408 is to provide timing signals that track the jitter/wander of the received serial bit stream, timing signals for aligning the received data into the parallel word for delivery to the core, timing signals for distributing the parallel word received from the core in preparation for merging with (replacing) the transmitted bit stream, and timing signals for controlling (enabling) the merge operation on a single bit boundary. In addition, clock signals for operating the 1:4 DEMUX 402 and the 4:1 MUX 406 are provided by the Timing block 408.

A further purpose of the Timing block 408 is to link the three timing domains (the Recovered Clock Domain, the Transmit Clock Domain, and the Core Clock Domain) in programmable phase relationships. The Transmit Clock Domain is slaved to the reference clock (CLK) and common to all channels (lanes) in order to meet AMB timing skew requirements on the serial outputs. The timing relationship between the Transmit Clock Domain and the Core Clock Domain may be programmed to facilitate the alignment of the merging operation. The timing relationship between the transmit clock and the recovered clock of each Channel Slice determines the ability of the circuit to absorb wander.

Although the Timing block 408 may be implemented in its entirety for each of the Channel Slices 400 (viz. the 24 typical Channel Slices 202, FIG. 2), only blocks that are included in the Recovered Clock Domain have to be implemented separately for each Channel Slice; blocks in the Transmit Clock Domain could be implemented in common for one or more Channel Slices. The choice may be made after considering the trade off of distributing high speed timing signals with attendant delay issues versus generating equivalent signals multiple times in different sections of the integrated circuit substrate.

The Timing block 408 comprises four main blocks, a Core Timing block 702, a Transmit Timing block 704, a Receive Timing block 706, and a Phase Alignment block 708.

In the implementation of the preferred embodiment of the invention, each Channel Slice 400 includes a complete Timing block 408.

The Core Timing block 702, comprising a Core Clock Generator 702a and a Clock Distribution block 702b, receives the reference clock CLK (420) which is distributed through the Clock Distribution block 702b to the Transmit Timing block 704 and the Receive Timing block 706. The Core Clock Generator 702a has two inputs, the distributed reference clock CLK and a T_slip signal 710 from the Phase Alignment block 708. The Core Timing block 702 generates a Core Clock 712 that is passed to the Phase Alignment block 708. In actual terms, the reference clock CLK may be a 4 GHz clock, equal to half the serial bit rate of 8 Gb/s, and the Core Clock 712 may be a 667 MHz clock (⅙th of CLK). The Core Timing Block 702 also provides a common "Reset" signal to the Transmit Timing block 704, for use in circuit initialization.

The Transmit Timing block 704 comprises a Transmit Clock Generator 714 and a Transmit Phase Generator 716. The Transmit Clock Generator 714 has as input the reference clock CLK, and generates a group of four transmit clock phases 718 (tck_pY, where Y=1 . . . 4) which are passed as inputs to the Transmit Phase Generator 716. The Transmit Phase Generator 716 in turn generates a group of twelve "clock enable" signals 720 (cenX_pY, where X=1 . . . 3 and Y=1 . . . 4).

The Receive Timing block 706 comprises an Adjustable PLL 722, a Receive Phase Generator 724, and a Latch Enable Generator 726. An input of the Adjustable PLL 722 is the Recovered Clock 334 (see FIG. 3) and a Programmable Shift control signal 728. The Adjustable PLL 722, details of which are outside the scope of this application, generates a group of four receive clock phases 730 (rck_pY, where Y=1 . . . 4) locked to the reference clock CLK, but finely controllable in their phase relationship to the received high speed data signal din_s (410, FIG. 4). The phase is controlled through the Programmable Shift control signal 728 which may carry a nine-bit digital value. The receive clock phases 730 are passed to the Receive Phase Generator 724 which generates a group of twelve "output enable" signals 732 (uenX_pY, where X=1 . . . 3 and Y=1 . . . 4). The "output enable" signals 732 are then passed as inputs to the Latch Enable Generator 726 which generates a group of twelve "latch enable" signals 733 (lenX_pY, where X=1 . . . 3 and Y=1 . . . 4).

The Phase Alignment block 708 comprises a Receive Phase Alignment block 734, a Transmit Phase Alignment block 736, a Receive Phase Detector 738, and a Transmit Phase Detector 740. The Receive Phase Detector 738 selects one of the "output enable" signals 732 and one of the "clock enable" signals 720, compares their phases and generates a digital TX/RX phase comparison signal 742, which is passed to the Receive Phase Alignment block 734. The Receive Phase Alignment block 734 in turn generates the Programmable Shift control signal 728 that is input to the Adjustable PLL 722. Similarly, the Transmit Phase Detector 740 receives the Core Clock 712 and another of the "clock enable" signals 720, compares their phases and generates a digital TX/Core phase sample 744, which is passed to the Transmit Phase Alignment block 736. The Transmit Phase Alignment block 736 in turn generates the T_slip signal 710 that is input to the Core Clock Generator 702a.

The Phase Alignment block 708 provides the capability of shifting the phase of the receive clocks 730 with respect to the transmit clock phases 718, as well as shifting the phase of the Core Clock 712 with respect to the transmit clock phases 718.

Components of the Timing block 408 are described in more detail with the help of the figures which follow.

Figure 8:
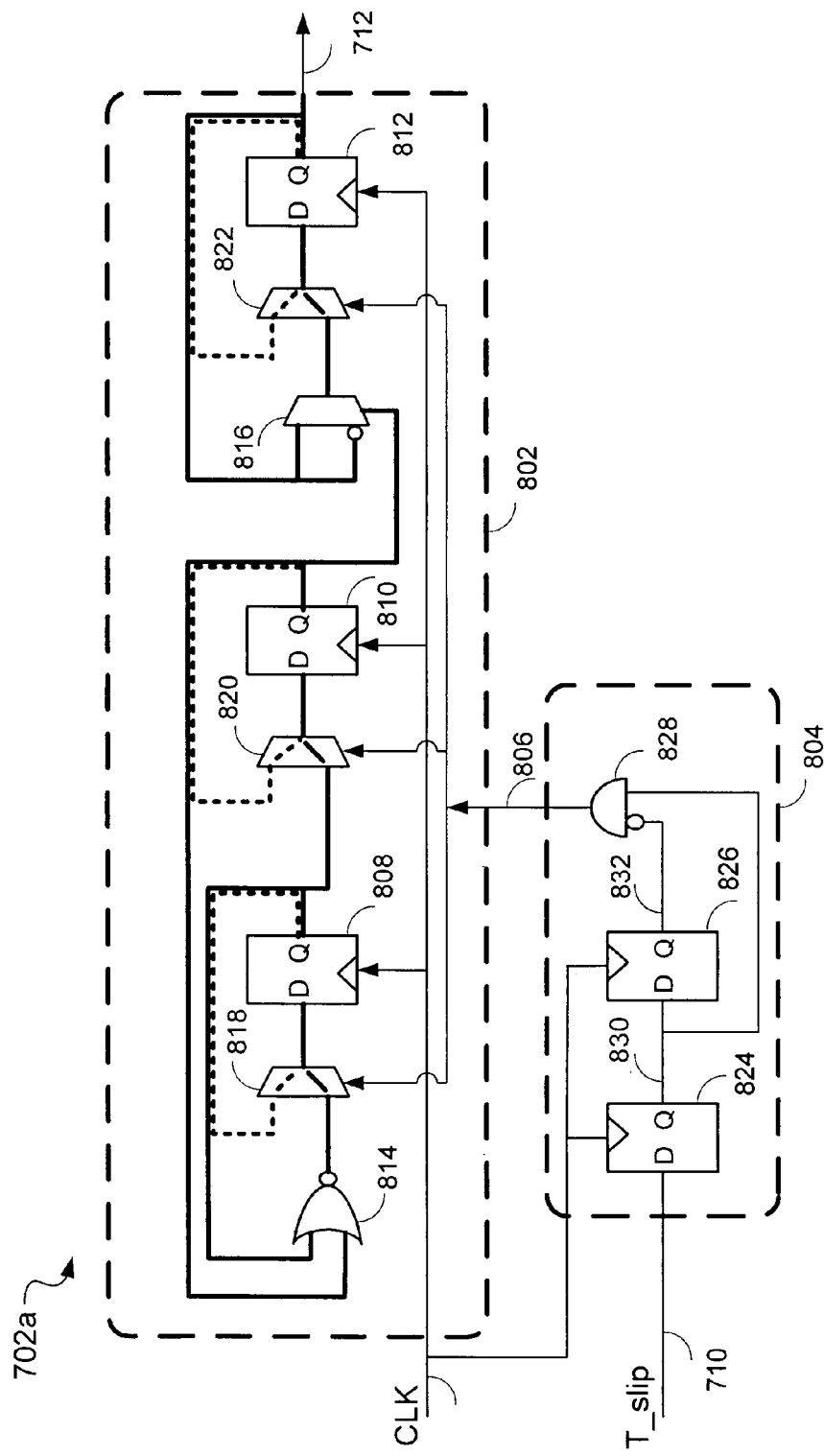
FIG. 8 shows circuitry that may be used to implement the Clock Generator 702a of the Core Timing Block 702 of the Timing block 408 of FIG. 7.

FIG. 8 shows circuitry that may be used to implement the Clock Generator 702a of the Core Timing Block 702. The Clock Generator 702a comprises a Clock Divider 802 and a Slip Control circuit 804, both circuits being driven by the reference clock CLK. The Slip Control circuit 804 outputs a slip control signal 806 that is input to the Clock Divider 802. The purpose of the slip control signal 806 is to select within the Clock Divider 802 between a normal mode (i.e. dividing) and a slip mode (in effect causing the Clock Divider 802 to stop).

The Clock Divider 802 includes a synchronous divide-by-six counter including D-type flip flops 808, 810, and 812 (all clocked by the reference clock CLK), a NOR gate 814, and a data selector 816 (wired to perform the function of an exclusive NOR gate), in a well known configuration that is indicated by a divide-by-six interconnectivity among the flip flops 808, 810, and 812, and the gates 814 and 816. The divide-by-six interconnectivity is shown in heavy solid lines in FIG. 8.

Inserted within the divide-by-six interconnectivity, in series with the D-inputs of each of the flip flops 808, 810, and 812, are data selectors 818, 820, and 822 respectively. In the normal mode, i.e. when the slip control signal 806 is not asserted, the Clock Divider 802 operates as the synchronous divide-by-six counter as described above. When the slip control signal 806 is asserted, i.e. in slip mode, the connectivity among the flip flops 808, 810, and 812 changes to a slip mode interconnectivity characterized by simple feedback from the output of each flip to its data input. The slip mode interconnectivity is indicated with heavy dotted lines in FIG. 8.

The Slip Control circuit 804 includes two D-type flip flops 824 and 826 and an AND gate 828. The Slip Control circuit 804 receives the T_slip signal 710 (FIG. 7) which is connected to the data input of the D-flip flop 824 whose output is connected to the data input of the D-flip flop 826. The inputs to the AND gate 828 are the output signal 830 of the D-flip flop 824 and the output signal 832 of the D-flip flop 826 after inverting the signal 832. The output of the AND gate 828 generates the slip control signal 806 that is connected to the Clock Divider 802. Both flip flops (824 and 826) are clocked by the reference clock CLK.

The Slip Control circuit 804 synchronizes the T_slip signal 710 with the local copy of the reference clock CLK (generating the FF 824 output signal 830), delays the FF 824 output signal 830 by one clock period (generating the FF 824 output signal 832), and generates the slip control signal 806 by ANDing the signal 830 with the inverted signal 832. As a result, the slip control signal 806 is asserted for one clock period after T_slip 710 is asserted for any period that contains at least one positive CLK edge. This permits a slower circuit (i.e. the Transmit Phase Adjustment 736, see FIG. 7) with the T_slip signal 710 to trigger a mode change of the Clock Divider 802 for one CLK period, in effect briefly increasing the period of the Core Clock 712 by ⅙th, thus causing a phase shift.

Figure 9:
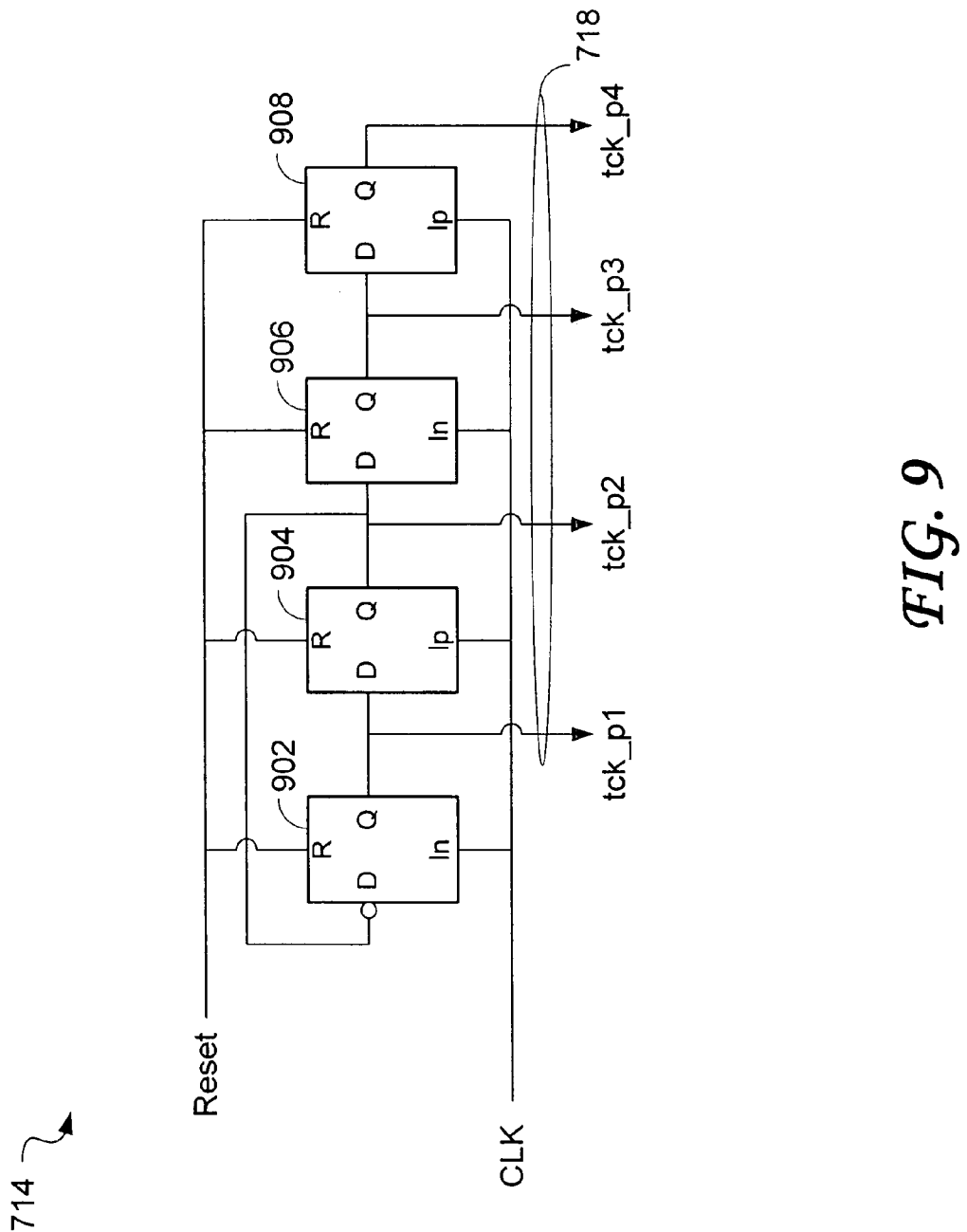
FIG. 9 shows a block diagram of circuitry that may be used to implement the Transmit Clock Generator 714 of the Timing block 408 of FIG. 7.

FIG. 9 shows a block diagram of circuitry that may be used to implement the Transmit Clock Generator 714. The Transmit Clock Generator 714 comprises four transparent latches 902, 904, 906, and 908, each having a reset input "R", a "D" data input, a "Q" data output, and a latch enable input ("ln" or "lp" to indicate latching on negative [i.e. low] or positive [i.e. high] polarities). The latches 902 and 906 are enabled (latching) when their latch enable inputs are low, and the latches 904 and 908 are enabled (latching) when their latch enable inputs are high.

The transparent latches 902 to 908 are connected as follows:

latch 902 "Q" to latch 904 "D";
latch 904 "Q" to latch 906 "D", and inverted to latch 902 "D";
latch 906 "Q" to latch 908 "D".

The latch enable inputs "lp" of the latches 902 and 906, and the latch enable inputs "ln" of the latches 904 and 908 are connected to the reference clock CLK. The reset inputs "R" of all four latches 902 to 908 are connected to a common "Reset" line. When the "Reset" line is asserted, all latches 902 to 908 are reset simultaneously.

The "Q" outputs of the latches 902 to 908 generate the four transmit clock phases 718, individually labeled tck_p1 to tck_p4.

At initialization of the Advanced Memory Buffer 200 (see FIG. 2), before the reference CLK is turned on, the common "Reset" signal is asserted to force all Transmit Clock Generators 714 of all Channel Slices 202 into a common state. This is to ensure that all bit lanes are in synchronism with each other, as far as transmit timing is concerned.

Once CLK is running, the combination of the two latches 902 and 904 forms a ring counter, cycling through the four states 00, 10, 11, 01, changing state on every clock edge. The latches 906 and 908 shift and delay the pattern from the "Q" output of the latch 904.

The pattern appearing at the transmit clock phases 718, individually labeled tck_p1 to tck_p4, will thus be 0000 (after reset), 1000 followed by a continuous repetition of the four patterns 1100, 0110, 0011, 1001, . . . as shown in the timing diagram of FIG. 11 below. The transmit clock phases 718 are used in the Transmit Phase Generator 714 to be described next, and also in the 4:1 MUX 406 (FIG. 4) in the generation of the high speed output bit stream dop_s at the output 412 (not shown in detail).

Figure 10:
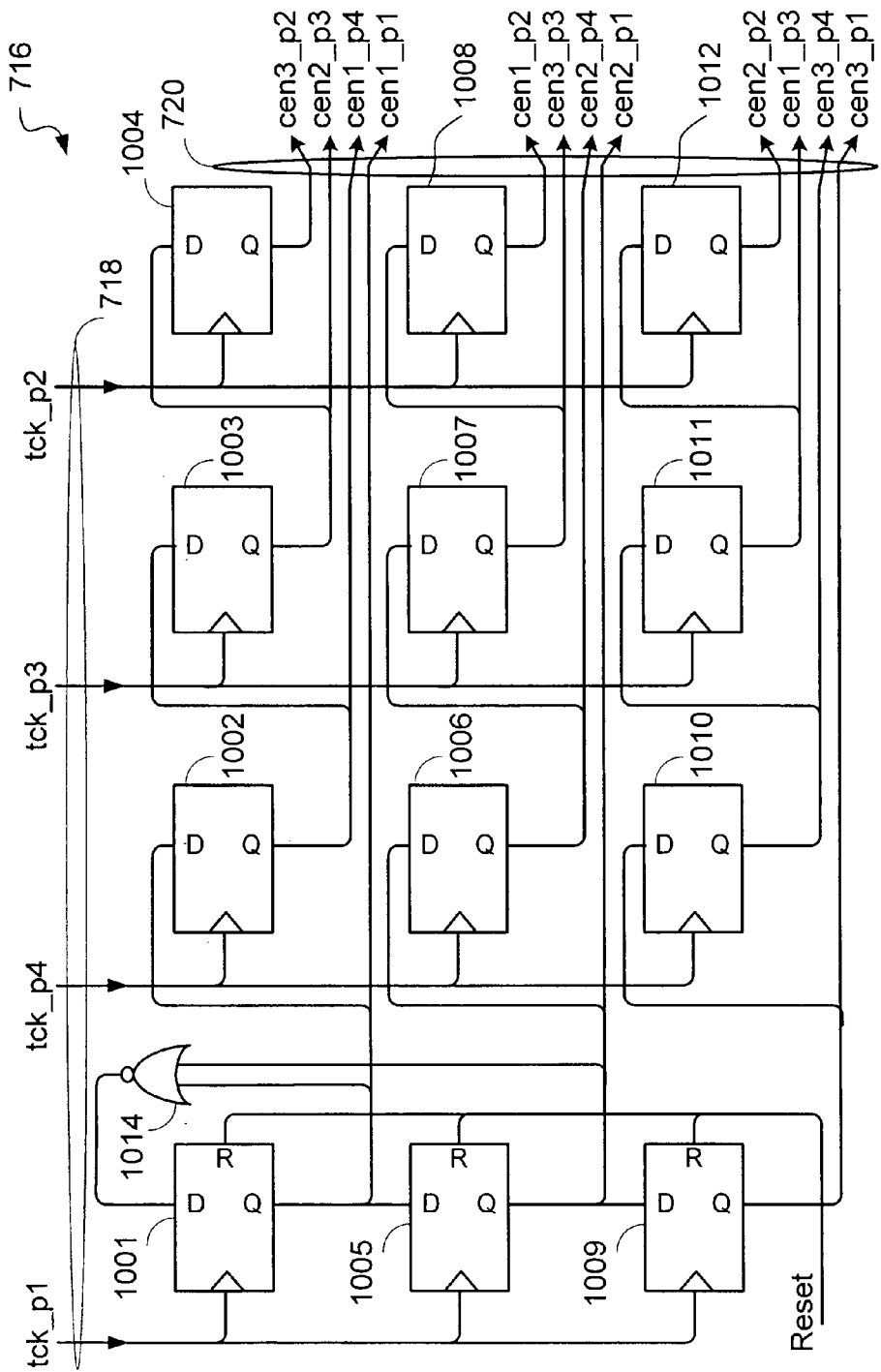
FIG. 10 shows a block diagram of circuitry that may be used to implement the Transmit Phase Generator 716 of the Timing block 408 of FIG. 7.

FIG. 10 shows a block diagram of circuitry that may be used to implement the Transmit Phase Generator 716. The Transmit Phase Generator 716 comprises twelve edge triggered storage elements (D-type flip flops) 1001, 1002, . . . to 1012, each having a clock input, a "D" data input and a "Q" data output. The Transmit Phase Generator 716 further includes a NOR gate 1014. In the diagram, the flip flops 1001 to 1012 are arranged in three rows of four flip flops each, that is in four columns. The transmit clock phases 718 (tck_p1, tck_p2, tck_p3, and tck_p4) are connected to the clock inputs of the flip flops as follows:

tck_p1 drives the flip flops in the 1st column (1001, 1005, and 1009);
tck_p2 drives the flip flops in the 2nd column (1002, 1006, and 1010);
tck_p3 drives the flip flops in the 3rd column (1003, 1007, and 1011); and
tck_p4 drives the flip flops in the 4th column (1004, 1008, and 1012).

The flip flops (FF) 1001 and 1005, and the NOR gate 1014 are interconnected in a well-known divide-by-three-counter configuration: the "D" input of the FF 1001 is connected to the output of the NOR gate 1014; the "Q" output of the FF 1001 is connected to the input of the FF 1005; the "Q" outputs of both, the flip flops 1001 and 1005 are each connected to one input of the NOR gate 1014.

The "D" input of the flip flop 1009 is connected to the "Q" output of the flip flop 1005.

The "D" inputs of the remaining flip flops, i.e. the "D" inputs of the flip flops shown in the 2nd, 3rd, and 4th columns are each connected to the "Q" outputs of the flip flops in the same row, but the previous column, as follows:

(1st row) 1001.Q to 1002.D, 1002.Q to 1003.D, 1003.Q to 1004.D;
(2nd row) 1005.Q to 1006.D, 1006.Q to 1007.D, 1007.Q to 1008.D; and
(3rd row) 1009.Q to 1010.D, 1010.Q to 1011.D, 1011.Q to 1012.D.

The twelve "Q" outputs of the flip flops 1001 to 1012 generate the twelve "clock enable" signals 720 (cenX_pY, X=1 to 3, Y=1 to 4) as follows:

(1st row)
1001.Q connected to cen1_p1,
1002.Q connected to cen1_p4,
1003.Q connected to cen2_p3, and
1004.Q connected to cen3_p2;
(2nd row)
1005.Q connected to cen2_p1,
1006.Q connected to cen2_p4,
1007.Q connected to cen3_p3, and
1008.Q connected to cen1_p2; and finally
(3rd row)
1009.Q connected to cen3_p1,
1010.Q connected to cen3_p4,
1011.Q connected to cen1_p3, and
1012.Q connected to cen2_p2.

The flip flops 1001, 1005, and 1009 (1st column) also each have an "R" reset input, all of which are connected to the common "Reset" signal that is used to initialize the circuitry in order to ensure all Channel Slices 202 (see FIG. 2) are synchronized.

The three flip flops 1001, 1005, and 1009 (1st column), being driven by a common clock (the transmit clock phase tck_p1) generate a 3-bit pattern from the three outputs (the "Q" outputs of the above mentioned three flip flops). This pattern is then taken by the flip flops in the 2nd column (the flip flops 1002, 1006, and 1010) and re-clocked with the transmit clock phase tck_p2, and so on in the 3rd and 4th column. Each of the twelve flip flops (1001 to 1012) thus generates one of the twelve "clock enable" signals 720.

Figure 11:
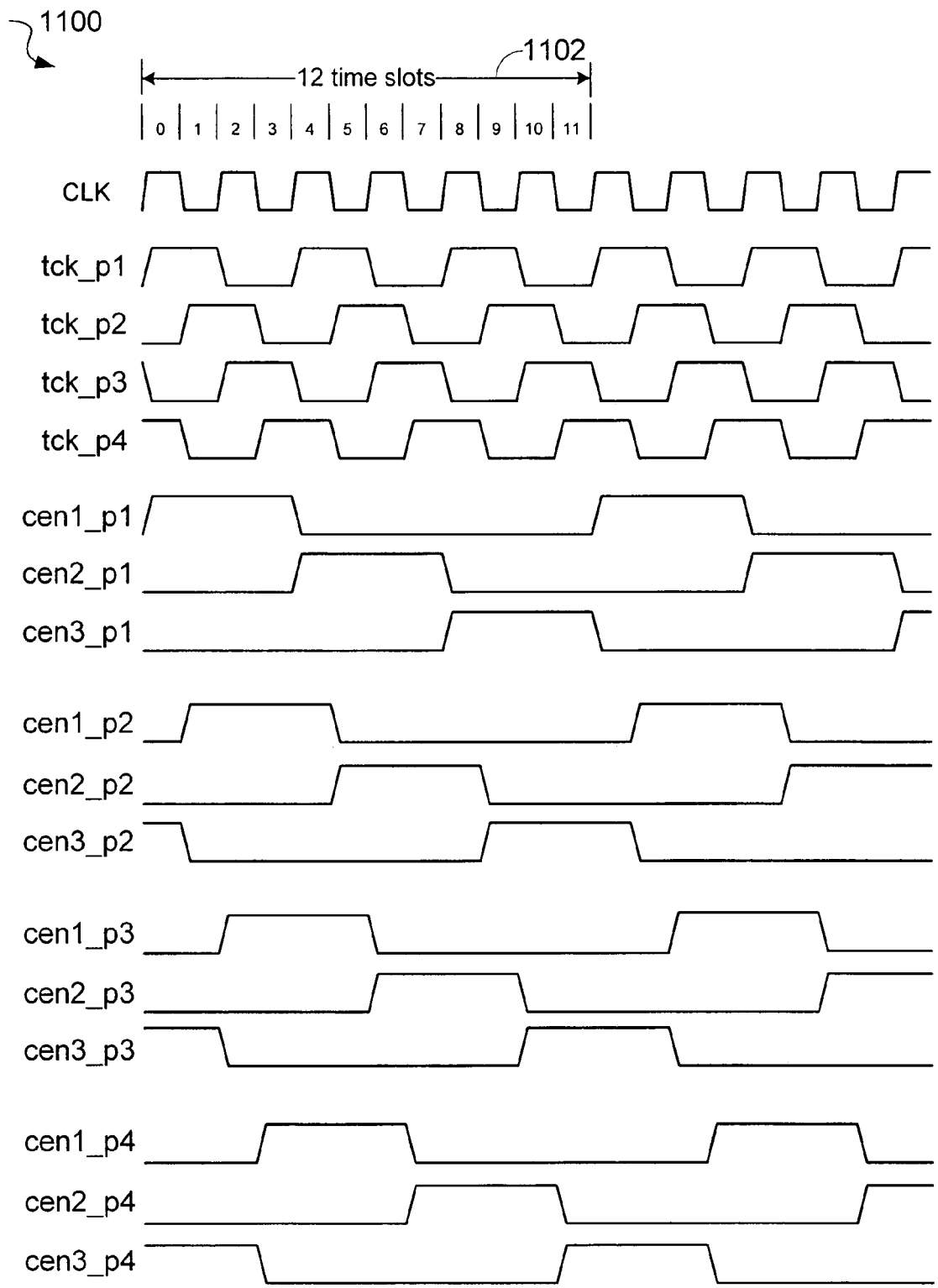
FIG. 11 shows the timing relationship between the reference clock CLK, the transmit clock phases 718 and the "clock enable" signals 720 of the Timing block 408 of FIG. 7.

FIG. 11 shows the timing relationship between the reference clock CLK, the transmit clock phases 718 and the "clock enable" signals 720, in the form of a timing diagram 1100, including an arbitrary frame 1102 of 12 time slots labeled 0 to 11 where each time slot corresponds to the unit interval (U.I.) or bit period of the data bit stream. The timing diagram illustrates that for every clock edge of the reference clock CLK, a rising edge of a transmit clock phase (tck_p1 to tck_p4) is generated. Furthermore, a rising edge of a "clock enable" signal cenX_pY (X=1 to 3, Y=1 to 4) is generated in each time slot of the frame 1102. These edges are sufficient to drive the 12:1 multiplexing system that may be made up of the 3:1 re-multiplexing of three bit slices within each phase slice 404 into a phase output 424 (see FIG. 15 below), and the 4:1 multiplexing of the phase outputs 424 by the 4:1 MUX 406 (FIG. 4).

Figure 12:
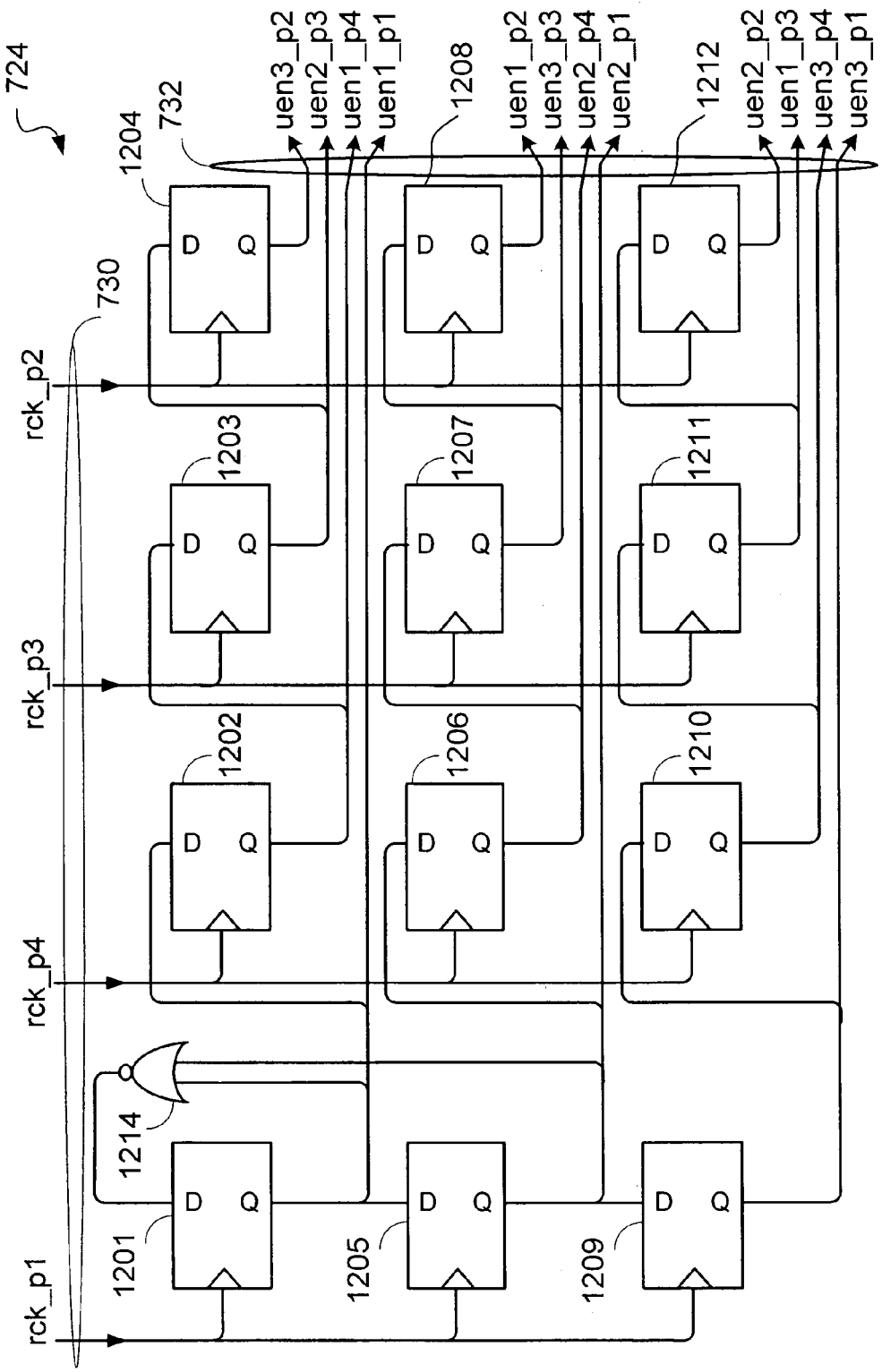
FIG. 12 shows a block diagram of circuitry that may be used to implement the Receive Phase Generator 724 of the Timing block 408 of FIG. 7.

FIG. 12 shows a block diagram of circuitry that may be used to implement the Receive Phase Generator 724 of FIG. 7. This circuit is almost identical to the circuit of the Transmit Phase Generator 716. The exception is that in the Receive Phase Generator 724 a reset is not required because the receive clocking of each Channel Slice 202 is independently synchronized with the high speed serial inputs 210 of the respective Channel Slice 202 (using the Adjustable PLL 722), whereas transmit clocking must be aligned between the Channel Slices 202 in order to meet transmit skew requirements.

In analogy to the Transmit Phase Generator 716 the Receive Phase Generator 724 comprises twelve edge triggered storage elements (D-type flip flops) 1201, 1202, . . . to 1212 and a NOR gate 1214. In the diagram, the flip flops 1201 to 1212 are arranged in three rows of four flip flops each, that is in four columns. The receive clock phases 730 (individually named rck_p1, rck_p2, rck_p3, and rck_p4) are connected to the clock inputs of the flip flops as follows:

- rck_p1 drives the flip flops in the 1st column (1201, 1205, and 1209);
- rck_p2 drives the flip flops in the 2nd column (1202, 1206, and 1210);
- rck_p3 drives the flip flops in the 3rd column (1203, 1207, and 1211); and
- rck_p4 drives the flip flops in the 4th column (1204, 1208, and 1212).

The flip flops (FF) 1201 and 1205, and the NOR gate 1214 are interconnected in a well-known divide-by-three-counter configuration: the "D" input of the FF 1201 is connected to the output of the NOR gate 1214; the "Q" output of the FF 1201 is connected to the input of the FF 1205; the "Q" outputs of both, the flip flops 1201 and 1205 are each connected to one input of the NOR gate 1214.

The "D" input of the flip flop 1209 is connected to the "Q" output of the flip flop 1205.

The "D" inputs of the remaining flip flops, i.e. the "D" inputs of the flip flops shown in the 2nd, 3rd, and 4th columns are each connected to the "Q" outputs of the flip flops in the same row, but the previous column, as follows:

- (1st row) 1201.Q to 1202.D, 1202.Q to 1203.D, 1203.Q to 1204.D;
- (2nd row) 1205.Q to 1206.D, 1206.Q to 1207.D, 1207.Q to 1208.D; and
- (3rd row) 1209.Q to 1210.D, 1210.Q to 1211.D, 1211.Q to 1212.D.

The twelve "Q" outputs of the flip flops 1201 to 1212 generate the twelve "output enable" signals 732 (uenX_pY, X=1 to 3, Y=1 to 4) as follows:

(1st row)
- 1201.Q connected to uen1_p1,
- 1202.Q connected to uen1_p4,
- 1203.Q connected to uen2_p3, and
- 1204.Q connected to uen3_p2;

(2nd row)
- 1205.Q connected to uen2_p1,
- 1206.Q connected to uen2_p4,
- 1207.Q connected to uen3_p3, and
- 1208.Q connected to uen1_p2; and finally (3rd row)
- 1209.Q connected to uen3_p1,
- 1210.Q connected to uen3_p4,
- 1211.Q connected to uen1_p3, and
- 1212.Q connected to uen2_p2.

The "output enable" signals 732 are further processed into a set of "latch enable" signals 733 in the Latch Enable Generator 726 (FIG. 7).

Figure 13:
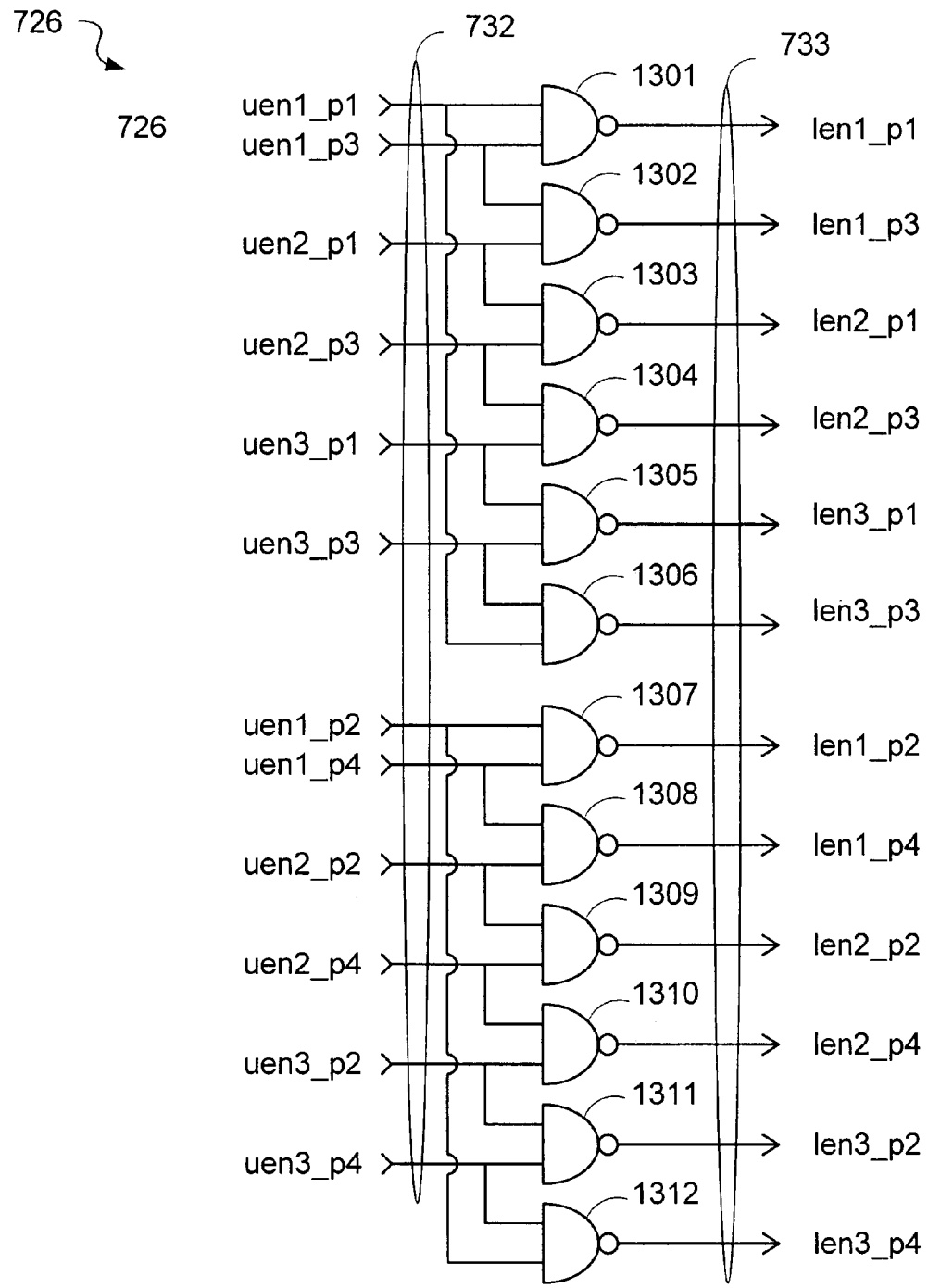
FIG. 13 shows a block diagram of circuitry that may be used to implement the Latch Enable Generator 726 of the Timing block 408 of FIG. 7.

FIG. 13 shows a block diagram of circuitry that may be used to implement the Latch Enable Generator 726 of FIG. 7. The Latch Enable Generator 726 comprises twelve (12) 2-input NAND gates 1301 to 1312. The input signals into the Latch Enable Generator 726 are the "output enable" signals 732 (uenX_pY, X=1 to 3, Y=1 to 4) which are pairwise connected to the inputs of the NAND gates 1301 to 1312 whose outputs provide the "latch enable" signals 733 (individually named lenX_pY, X=1 to 3, Y=1 to 4) as follows:

- uen1_p1+uen1_p3 input to the NAND gate 1301: output len1_p1;
- uen1_p3+uen2_p1 input to the NAND gate 1302: output len1_p3;
- uen2_p1+uen2_p3 input to the NAND gate 1303: output len2_p3;
- uen2_p3+uen3_p3 input to the NAND gate 1304: output len2_p3;
- uen3_p1+uen3_p3 input to the NAND gate 1305: output len3_p3;
- uen3_p3+uen3_p3 input to the NAND gate 1306: output len3_p3;
- uen1_p2+uen1_p4 input to the NAND gate 1307: output len3_p2;
- uen1_p4+uen2_p2 input to the NAND gate 1308: output len1_p4;
- uen2_p2+uen2_p4 input to the NAND gate 1309: output len2_p2;
- uen2_p4+uen3_p2 input to the NAND gate 1310: output len2_p4;
- uen3_p2+uen3_p4 input to the NAND gate 1311: output len3_p2; and
- uen3_p4+uen1_p2 input to the NAND gate 1312: output len3_p4.

Figure 14:
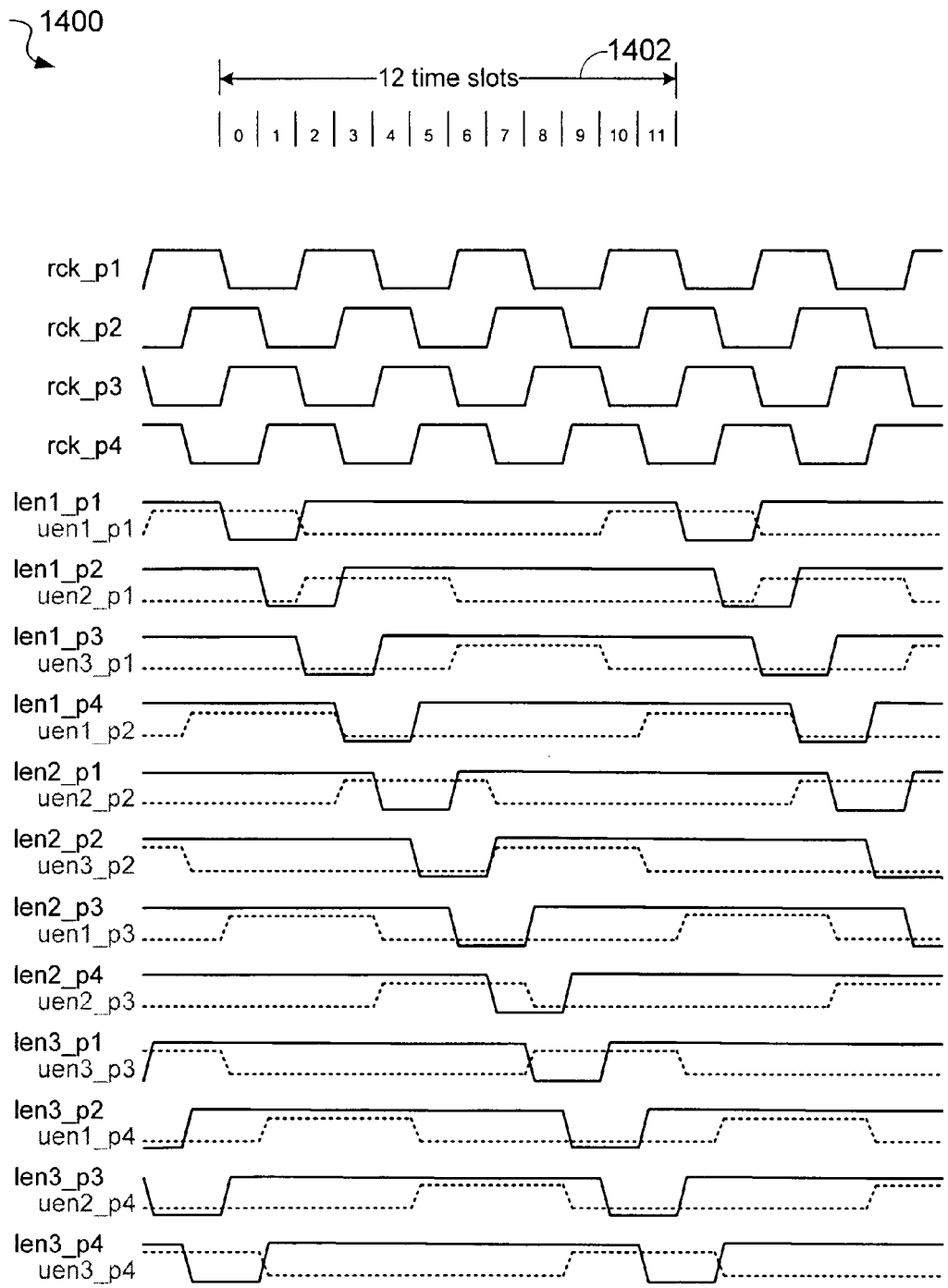
FIG. 14 shows the timing relationship between the receive clock phases 730, the "output enable" signals 732, and the "latch enable" signals 733 of the Timing block 408 of FIG. 7.

FIG. 14 shows the timing relationship between the receive clock phases 730 (rck_p1, rck_p2, rck_p3, and rck_p4), the "output enable" signals 732, and the "latch enable" signals 733 (lenX_Y), in the form of a timing diagram 1400, including an arbitrary frame 1402 of 12 time slots labeled 0 to 11 where each time slot corresponds to the unit interval or bit period of the high speed data bit stream din_s. Timing of the "output enable" signals 732 (uenX_pY, X–1 to 3, Y=1 to 4) is shown in dotted lines with labels inset; their timing is similar to the timing of the "clock enable" signals 704 (see FIG. 11), having been generated by a similar circuit (the Receive and Transmit Phase Generators 724 and 716 respectively, see FIGS. 12 and 10).

Each "latch enable" signal lenX_pY (X=1 to 3, Y=1 to 4) is periodically driven low for two time slots (each time slot corresponds to the unit interval or bit period of the data bit stream). For example, with reference to the arbitrary 12-time slot frame, the "latch enable" signal len1_p1 goes low at the beginning of the time slot 0 and goes high at the end of the time slot 1; similarly the "latch enable" signal len1_p2 goes low at the beginning of the time slot 1 and goes high at the end of the time slot 2, and so on for all 12 "latch enable" signals. The "latch enable" signals are suitable for sampling and demultiplexing the incoming data bit streams, as will be shown in FIG. 17 below.

Figure 15:
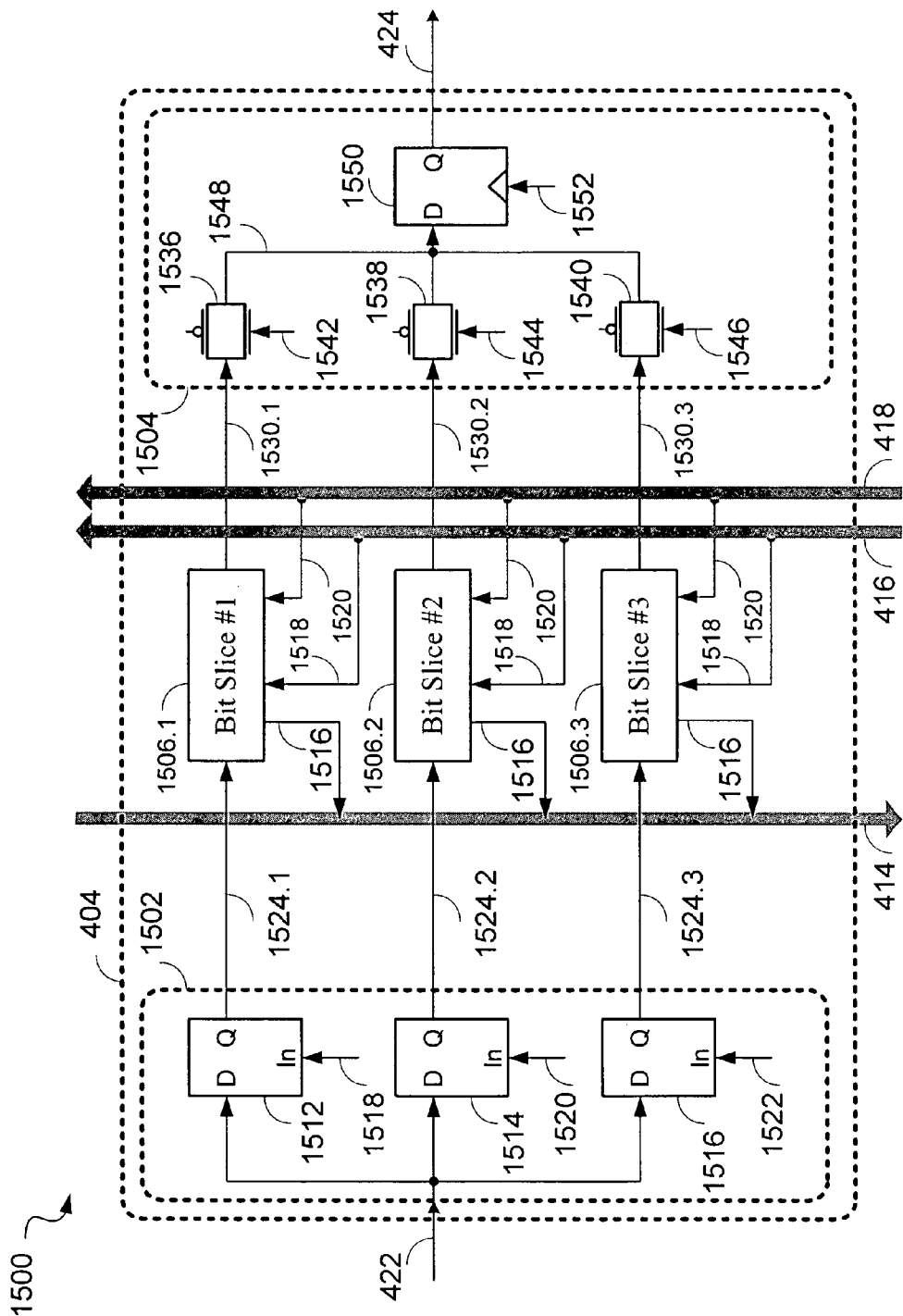
FIG. 15 shows a block diagram 1500 of a typical Phase Slice 404 of the Channel Slice 400 of FIG. 4.

FIG. 15 shows a block diagram 1500 of a typical Phase Slice 404 (see FIG. 4). This implementation is repeated for the each of the Phase Slices #1 to #4 with different timing signals assigned as described in below (FIG. 25).

The typical Phase Slice 404 of FIG. 1500 comprises a 1:3 Demux Block 1502; a 3:1 Mux block 1504; and three Bit Slices 1506: a Bit Slice #1 (1506.1), a Bit Slice #2 (1506.2), and a Bit Slice #3 (1506.3).

The 1:3 Demux Block 1502 includes three storage elements (transparent negative enable latches) 1512, 1514, and 1516 whose "D" data inputs are jointly connected to one of the "phase inputs" 422 (FIG. 4). The "ln" negative enable inputs of the latches (1512, 1514, and 1516) are separately connected to three of the "latch enable" signals 733 (see FIG. 7) "latch enable" inputs 1518, 1520, and 1522 respectively. The "Q" outputs of the latches provide "demultiplexed data bit" outputs 1524.1, 1524.2, and 1524.3 respectively.

Each of the three "demultiplexed data bit" signals 1524.1, 1524.2, and 1524.3 serves as input to a corresponding Bit Slice (1506.1, 1506.2, and 1506.3 respectively).

The Bit Slice 1506.1 receives the "demultiplexed data bit" signal 1524.1 and generates a "merged output data bit" signal 1530.1. Similarly, the Bit Slices 1506.2 and 1506.3 process the "demultiplexed data bit" signals 1524.2 and 1524.3 to generate "merged output data bit" signals 1530.2 and 1530.3 respectively.

The three "merged output data bit" signals 1530 are input to the 3:1 Mux block 1504 in which they are multiplexed into the serial output stream, the "phase output" 424 (see FIG. 4).

The Mux block 1504 comprises three transmission gates 1536, 1538, and 1540 whose data inputs are connected to the "merged output data bit" signals 1530.1, 1530.2, and 1530.3 respectively. The control inputs of the transmission gates 1536, 1538, and 1540 are connected to three of the "clock enable" signals 720 (FIG. 10) "clock enable" inputs 1542, 1544, and 1546 respectively. The data outputs of the transmission gates 1536, 1538, and 1540 are joined to a single node representing a "3-way multiplexed bit" signal 1548. The Mux block 1504 further includes a retiming flip flop (a D-type flip flop) 1550 whose "D" input is connected to the "3-way multiplexed bit" signal 1548, and whose clock input is connected to a transmit clock 1552 (one of the transmit clock phases 718, FIG. 7). The "Q" output of the flip flop 1550 is connected to the "phase output" 424 (see FIG. 4). The retiming flip flop 1550 may not be required, depending on the latency requirements of the circuit and the nature of the circuit to which the "phase output" 424 is connected (the 4:1 MUX 406, see FIG. 4).

Each Bit Slice 1506 further includes a 1-bit "aligned demux data" bit output 1516 that is part of the Data Extraction highway 414, over which each Bit Slice contributes one bit of the twelve-bit parallel demultiplexed data word "dData[11:0]" that is presented by the Channel Slice 400 to the Core 204.

Additionally, each Bit Slice 1506 includes a 1-bit "merged data bit" input 1518 that is part of the Data Insertion highway 416, over which each Bit Slice receives one bit of the twelve-bit parallel merged data word "mData[11:0]" that is presented by the Core 204 to the Channel Slice 400.

Each Bit Slice 1506 also includes a 1-bit "merge-enable control bit" input 1520 that is part of the Merge Control Highway 418, over which each Bit Slice receives one bit of the twelve-bit parallel merge-enable control word "mEn[11:0]" that is presented by the Core 204 to the Channel Slice 400.

Figure 16:
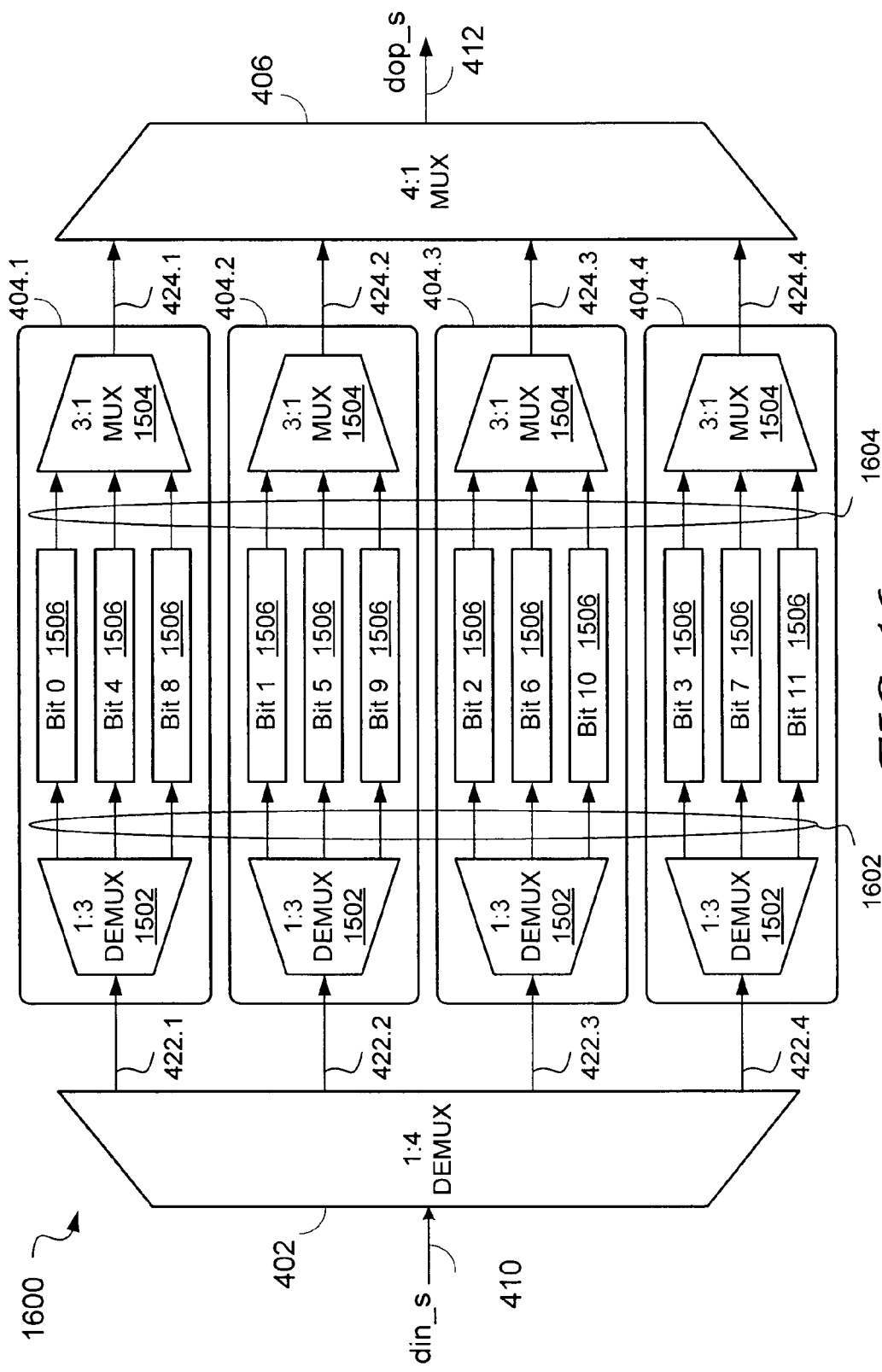
FIG. 16 illustrates a simplified aspect 1600 of the Channel Slice 400 of FIG. 4.

FIG. 16 illustrates a simplified aspect 1600 of the Channel Slice 400 (FIG. 4), in the interest of clarity omitting to show the core highways (414, 416, and 418) and the Timing block 420. FIG. 16 summarizes the 1:12 demultiplexing/multiplexing hierarchy according to the preferred embodiment of the invention. The Channel Slice 400 includes the 1:4 DEMUX stage 402, the four Phase Slices 404.1 through 404.4, and the 4:1 MUX stage 406. Within each Phase slice 404 are shown the 1:3 DEMUX 1502, the 3:1 MUX 1504, and three instances of the Bit Slice 1506 (as in FIG. 15). The Bit Slices 1506 are further identified with a label "Bit Z" where Z ranges from Z=0 to Z=11.

The incoming bit stream din_s (at the high speed serial input 410) is demultiplexed in the 1:4 DEMUX stage 402 to yield four separate lower speed input data streams (the "phase inputs" 422.1 to 422.4) which are further demultiplexed in the four 1:3 DEMUX blocks 1502. The outputs of the 1:3 DEMUX blocks 1502 form a set of 12 data bit streams 1602, running at one twelfth the rate of the incoming bit stream. In effect, each bit has now been stretched to 12 times its original length, but because the bits (tData[0] to tData[11], see below) are staggered, they can each be accessed without incurring additional delay (beyond the sampling delay, typically less than 1 UI).

The 12 data bit streams are separately processed (aligned with the transmit clock and core clock domains, and interact with the parallel core data) by the 12 Bit Slices 1506, to yield a set of 12 merged data bit streams 1604.

The merged data bit streams 1604 are multiplexed in groups of three by the four 3:1 MUX blocks 1504 into the four "phase outputs" 424. The four phase outputs 424.1 through 424.4 are input into the 4:1 MUX stage 406, for re-multiplexing into the single high speed output bit stream dop_s to be sent out on the high speed serial output 412, as described earlier.

Figure 17:
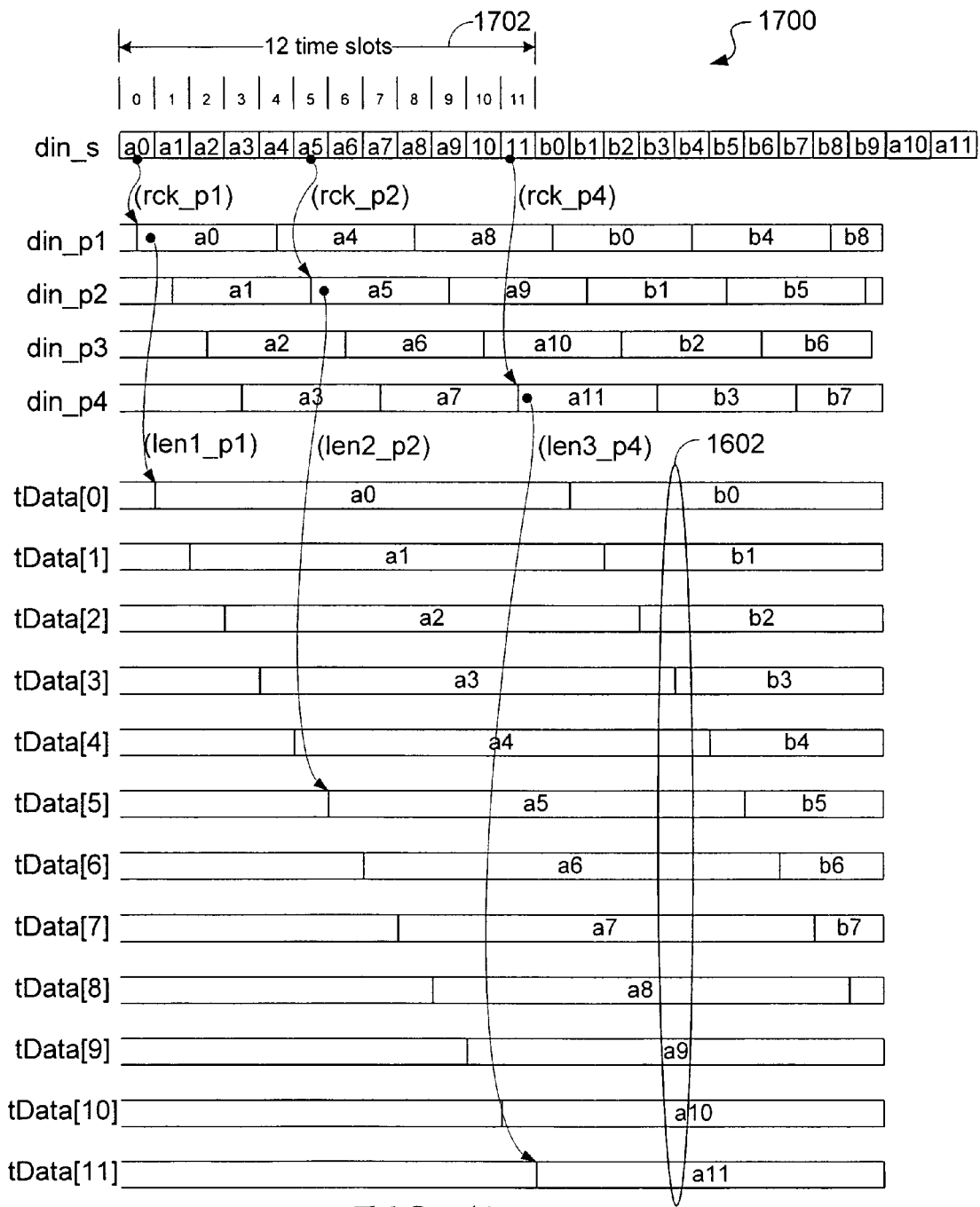
FIG. 17 is a timing diagram 1700 showing the demultiplexing chain from the high speed serial input 410 to the data bit streams 1602 of the simplified aspect 1600 of FIG. 16.

FIG. 17 is a timing diagram 1700 showing the demultiplexing chain from the high speed serial input 410 to the data bit streams 1602. Shown in the timing diagram 1700 are:

- a time scale 1702 indicating 12 time slots in the receive clock domain that represent the timing of the high speed serial input 410;
- the high speed serial bit stream din_s of the high speed serial input 410, with individual bits a0 ... a11, b0 ..., etc.;
- the four lower speed input data streams din_p1 to din_p4 (see FIG. 5) at the "phase inputs" 422.1 to 422.4; and
- the twelve data bit streams 1602, individually labeled tData[0] to tData[11].

A first set of curved arrows from selected bits in the high speed serial bit stream din_s to the corresponding bits in the lower speed input data streams din_p1 to din_p4, are drawn in the diagram to symbolize the action of the 1:4 DEMUX stage 402. In the interest of clarity of the drawing, only three bits have been selected (bits labeled a0, a5, and a11) as examples, it being understood that all bits of the high speed serial bit stream din_s are demultiplexed into bits of the lower speed input data streams din_p1 to din_p4. The arrows are labeled with the names of the specific receive clock signals (rck_p1 to rck_p4) that are used to clock the sampling flip flops (D-type flip flops 502.1 to 502.4, see FIG. 5) in the 1:4 DEMUX stage 402.

Similarly a second set of curved arrows from selected bits in the lower speed serial input data streams din_p1 to din_p4 to the corresponding bits in the data bit streams tData[0] to tData[11], are drawn in the diagram to symbolize the action of the 1:3 DEMUX stage 1502. In the interest of clarity, the same three bits (bits labeled a0, a5, and a1 1) are followed, it being understood that all bits of the (lower speed) serial input data stream din_p1 to din_p4 are demultiplexed into bits of the data bit streams tData[0] to tData[11] in an analogous manner. The arrows are labeled with the names of the specific latch enable signals (lenX_pY) that are used to clock the transparent latches (1512, 1514, or 1516 as required, see FIG. 15) in the 1:3 DEMUX stage 1502 of the appropriate phase slice 404.

Figure 18:
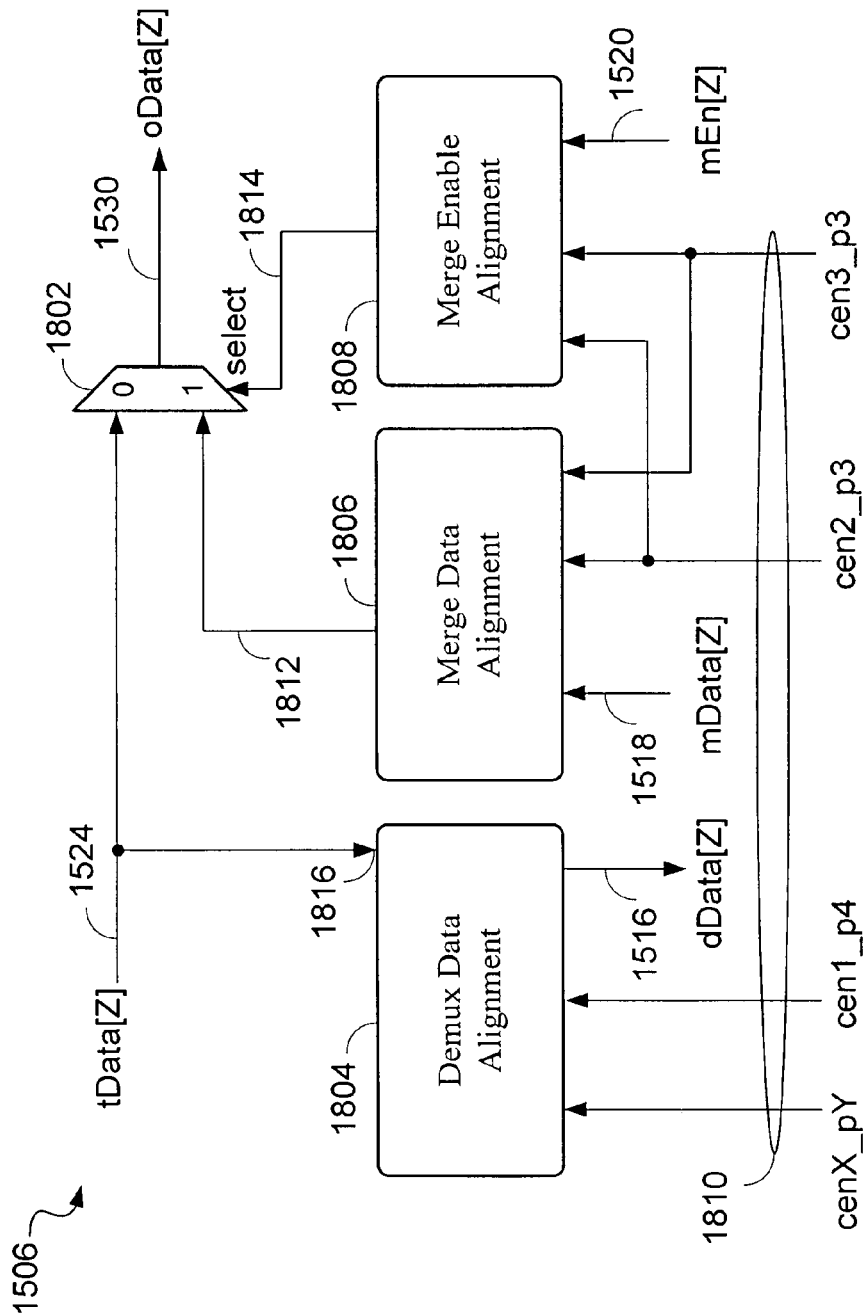
FIG. 18 shows a block diagram of circuitry that may be used to implement the Bit Slice 1506 of the typical Phase Slice 404 of FIG. 15.

FIG. 18 shows a block diagram of circuitry that may be used to implement the Bit Slice 1506. The Bit Slice 1506 comprises a 2:1 Multiplexer 1802 (having a "0", a "1", and a "select" inputs), a Demux Data Align block 1804, a Merge Data Align block 1806, and a Merge Enable Align block 1808. Each of the blocks 1804 to 1808 has one output and three inputs. Each Bit Slice 1506 is unique and serves to process one of the 12 data bits (indexed [Z], Z=0 to 11), however the general structure shown in FIG. 18 is common to all Bit Slices 1506 as shown in FIG. 18.

Inputs to the Bit Slice[Z] (Z=0 to 11) are:
(1524): one of the demultiplexed bit tData[Z] of the data bit stream 1524;
(1518): one of the merged data bit mData[Z] of the merged data word "mData[11:0]";
(1520): one of the merge enable bit mEn[Z] of the merge-enable control word "mEn[11:0]"; and
bit slice timing signals 1810 (selected clock enable signals 720 see FIGS. 7 and 10) which include one of the clock enable signal cenX_pY as well as the clock enable signals cen1_p4, cen2_p3, and cen3_p3.

The Bit Slice [Z] outputs:
(1516): one of the demultiplexed data bit dData[Z] of the demultiplexed data word dData[11:0]; and
(1530): one of the merged data output bit oData[Z].

The one of the demultiplexed bit tData[Z] (node 1524) is connected to the "0" input of the 2:1 Multiplexer 1802, the "1" input being connected through a link 1812 to the output of the Merge Data Align block 1806. The "select" input is connected through a link 1814 to the output of the Merge Enable Align block 1808.

The one of the demultiplexed bit tData[Z] (node 1524) is further connected to a data input 1816 of the Demux Data Align block 1804 which outputs the one of the demultiplexed data bit dData[Z] (1516). The one of the clock enable signal cenX_pY and the clock enable signals cen1_p4 are inputs to the Demux Data Align block 1804.

Inputs to the Merge Data Align block 1806, and a Merge Enable Align block 1808 are the one of the merged data bit mData[Z] (1518) and the one of the merge enable bit mEn[Z] (1520) respectively, as well as the enable signals cen2_p3 and cen3_p3 available to both blocks.

Each of the Demux Data Align block 1804, the Merge Data Align block 1806, and the Merge Enable Align block 1808 may be configured differently, depending on the value of "Z".

Figure 19:
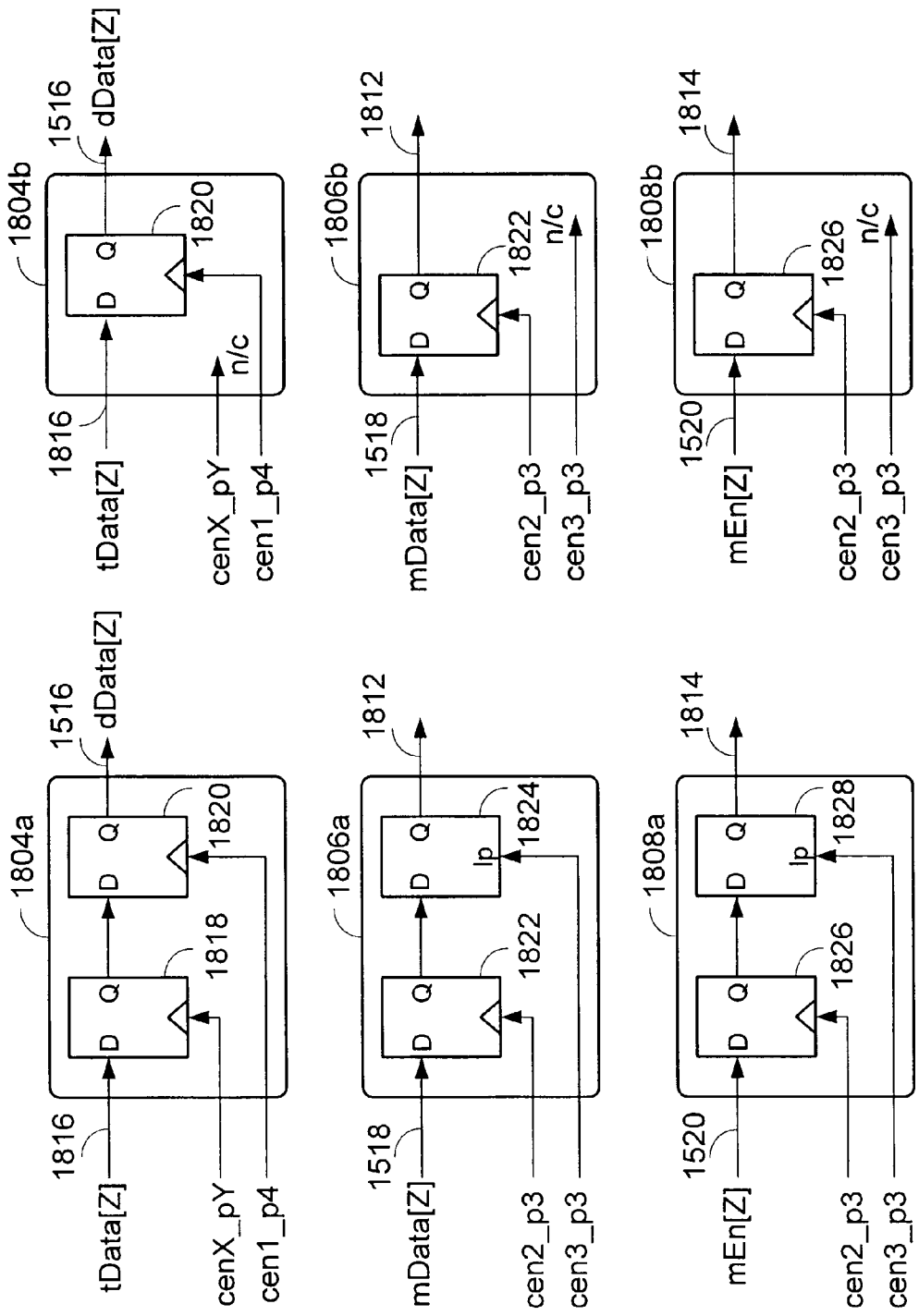
FIG. 19 shows two configurations for each of the blocks 1804, 1806 and 1808 of FIG. 18.

Shown in FIG. 19 are two configurations for each of the blocks 1804, 1806 and 1808 of FIG. 18, referenced here as 1804a, 1806a to 1808a and 1804b, 1806b to 1808b respectively.

Each of the blocks 1804a, 1806a, and 1808a includes two storage elements (flop flops or latches), in series but independently clocked. The blocks 1804b, 1806b, and 1808b differ from the corresponding blocks 1804a, 1806a, and 1808a in that they omit one of the two storage elements.

The configuration 1804a of the Demux Data Align block 1804 includes two storage elements 1818 and 1820 which may both be implemented with D-type (clocked) flip-flops. As an optimization, the storage element 1820 may be implemented with a transparent latch for certain values of Z in order to reduce power consumption. The selected demultiplexed bit tData[Z] (input 1816) is connected to the "D" input of the storage element 1818 whose "Q" output is connected to the "D" input of the storage element 1820. The "Q" output of the storage element 1820 provides the selected demultiplexed data bit dData[Z] 1516. The clock (or if applicable, the enable) inputs of the storage elements 1818 and 1820 are connected to the clock enable signals cenX_pY (as specified in FIG. 25 below) and cen1_p4 respectively.

The configuration 1804b of the Demux Data Align block 1804 is similar to the configuration 1804a but includes only the storage element 1820 whose "D" input is directly connected to the selected demultiplexed bit tData[Z] (input 1816) and whose clock input is connected to the clock enable signal cen1_p4. The clock enable signal cenX_pY is not used in the configuration 1804b.

The configuration 1806a of the Merge Data Align block 1806 includes two storage elements 1822 and 1824. The storage element 1822 may be implemented with a D-type (clocked) flip-flop. The storage element 1824 may be implemented with a transparent latch. The merged data bit mData [Z] (input 1518) is connected to the "D" input of the storage element 1822 whose "Q" output is connected to the "D" input of the storage element 1824. The "Q" output of the storage element 1824 is connected through the link 1812 to the "1" input of the 2:1 multiplexer 1802 (see FIG. 18). The clock input of the storage element 1822 is connected to the clock enable signal cen2_p3, and the clock input of the storage element 1824 is connected to the clock enable signal cen3_p3.

The configuration 1806b of the Merge Data Align block 1806 is similar to the configuration 1806a but includes only the clocked storage element 1822 whose "Q" output is directly connected through the link 1812 to the "1" input of the 2:1 multiplexer 1802. The storage element 1822 is clocked by the clock enable signal cen2_p3, but the clock enable signal cen3_p3 is not used in the configuration 1806b.

The configuration 1808a of the Merge Enable Align block 1808 includes two storage elements 1826 and 1828. The storage element 1826 may be implemented with a D-type (clocked) flip-flop. The storage element 1828 may be implemented with a transparent latch. The merge enable bit mEn[Z] (input 1520) is connected to the "D" input of the storage elements 1826 whose "Q" output is connected to the "D" input of the storage elements 1828. The "Q" output of the storage elements 1828 is connected through the link 1814 to the "select" input of the 2:1 multiplexer 1802 (see FIG. 18). The clock input of the storage element 1826 is connected to the clock enable signal cen2_p3, and the clock input of the storage element 1828 is connected to the clock enable signal cen3_p3.

The configuration 1808b of the Merge Enable Align block 1808 is similar to the configuration 1808a but includes only the clocked storage element 1826 whose "Q" output is directly connected through the link 1814 to the "select" input of the 2:1 multiplexer 1802. The storage element 1826 is clocked by the clock enable signal cen2_p3, but the clock enable signal cen3_p3 is not used in the configuration 1808b.

Table 1 in FIG. 20 shows the relationship between the index "Z" and the configuration choices for the Alignment blocks 1804, 1806, and 1808 of FIGS. 18 and 19. The Table 1 comprises 4 columns, an index column "Z"=0 to 11 and three configurations columns headed 1804, 1806, and 1808. In each configuration column, the appropriate configuration (e.g. 1804a or 1804b) is shown for each value of "Z". In the configurations 1804a marked with an asterisk (*) the storage element 1820 may advantageously be a transparent (positive enable) latch instead of a D-type flip flop, in order to reduce power consumption and the amount of circuitry (typically, a D-type flip flop may be constructed from two transparent latches; here, only one transparent latch is required).

Before describing the functionality of the Channel Slice 400, and its data paths, the Rx and Tx Phase alignment processes should be understood.

A purpose of the Tx Phase alignment process is to establish a known (fixed) timing relationship between the core clock and one of the clock enable signals 720.

Figure 21:
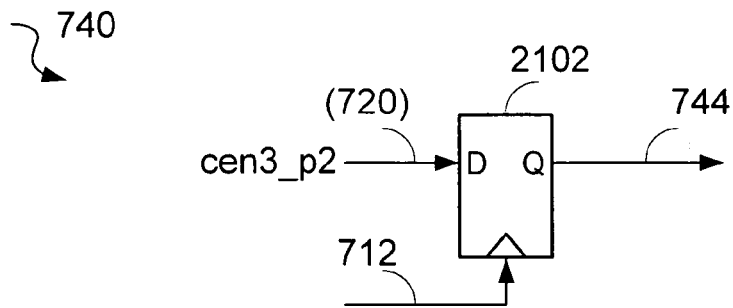
FIG. 21 shows a block diagram of the Transmit Phase Detector 740 of the Timing block 408 of FIG. 7.

FIG. 21 shows a block diagram of the Transmit Phase Detector 740 which may be implemented using a D-type flip flop 2102 that is clocked by the Core Clock 712 (see FIG. 7 and FIG. 8). The "D" input of the flip flop 2102 may be connected to one of the clock enable signals 720, for example the signal cen3_p2. The output (the TX/Core phase sample 744) of the Transmit Phase Detector 740 is connected to the "Q" output of the flip flop 2102.

The frequency of the Core Clock 712 is ⅙th of the reference clock CLK, the same as the frequency of the clock enable signal cen3_p2 (which is derived from the reference clock CLK via the Transmit Clock Generator 714), and is thus synchronous with it. The TX/Core phase sample 744 may be logic "0" or "1" and merely indicates whether an edge of the Core Clock 712 occurs when the clock enable signal cen3_p2 is low ("0") or high ("1").

The functionality of the Transmit Phase Alignment 736 (FIG. 7) may be implemented as a simple algorithm that runs once, using the TX/Core phase sample 744 from the Transmit Phase Detector 740, and issuing T_slips 710 to the Core Clock Generator 702*a* which, as described above (FIG. 8) slows the core clock down by extending one clock cycle, thus shifting its phase.

Figure 22:
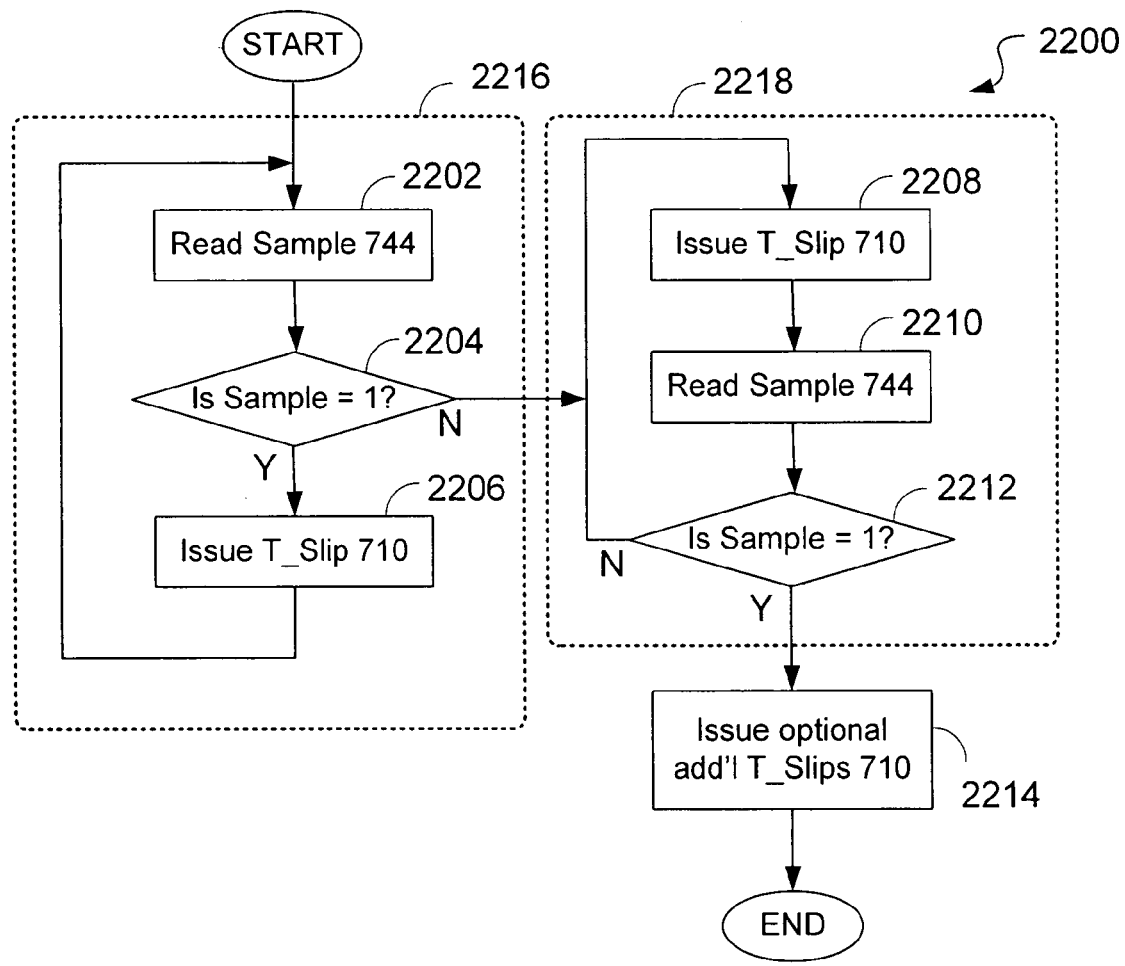
FIG. 22 is a flow chart 2200 of the algorithm that implements the functionality of the Transmit Phase Alignment block 736 of the Timing block 408 of FIG. 7.

FIG. 22 is a flow chart 2200 of the algorithm that implements the functionality of the Transmit Phase Alignment block 736 (FIG. 7).

The algorithm comprises the steps:

"START";

2202 "Read Sample 744";

2204 "Is Sample=1?";

2206 "Issue T_Slip 710";

2208 "Issue T_Slip 710";

2210 "Read Sample 744";

2212 "Is Sample=1?";

2214 "Issue optional additional T_Slips 710"; and

"END"

The algorithm comprises two loops, a first loop 2216 (including the steps 2202 to 2206) followed by a second loop 2218 (including the steps 2208 to 2212), and the optional step 2214.

In the first loop 2216, a phase sample is read (the step 2202 "Read Sample 744"), compared with the value "1" (the step 2204 "Is Sample equal to 1"?), and if the result is "YES", a T_Slip signal 710 is issued to the Core Clock Generator 702*a* (the step 2206 "Issue T_Slip 710"). This first loop 2216 is executed as long as the phase samples 744 are "1". When a sample 744 is read that is not equal to "1", the second loop 2218 is entered.

In the second loop 2218, a T_Slip signal 710 (the step 2208 "Issue T_Slip 710") is issued to the Core Clock Generator 702*a*, a phase sample is read (the step 2210 "Read Sample 744"), and compared with the value "1" (the step 2212 "Is Sample equal to 1?"). If the result is "NO", the second loop 2218 is re-entered, and continues to be executed until the phase sample 744 is equal to "1". At this point, the rising edge of the Core Clock 712 (used to clock the D-type flip flop 2102 in the Transmit Phase Detector 740) is within 2 unit intervals (UI) of the rising edge of the sampled clock enable signal cen3_p2 (see FIG. 21). By choosing a different clock enable signal cenX_pY (720) in the Transmit Phase Detector 740, a different phase relationship between the Core Clock 712 and the transmit clocks 718 and hence the clock enable signals 720 could be achieved. Alternatively, a number of additional T_Slips (the step 2214 "Issue optional additional T_Slips 710") could be issued to shift the phase of the Core Clock 712 to any desired point within 2 UIs.

Figure 23:
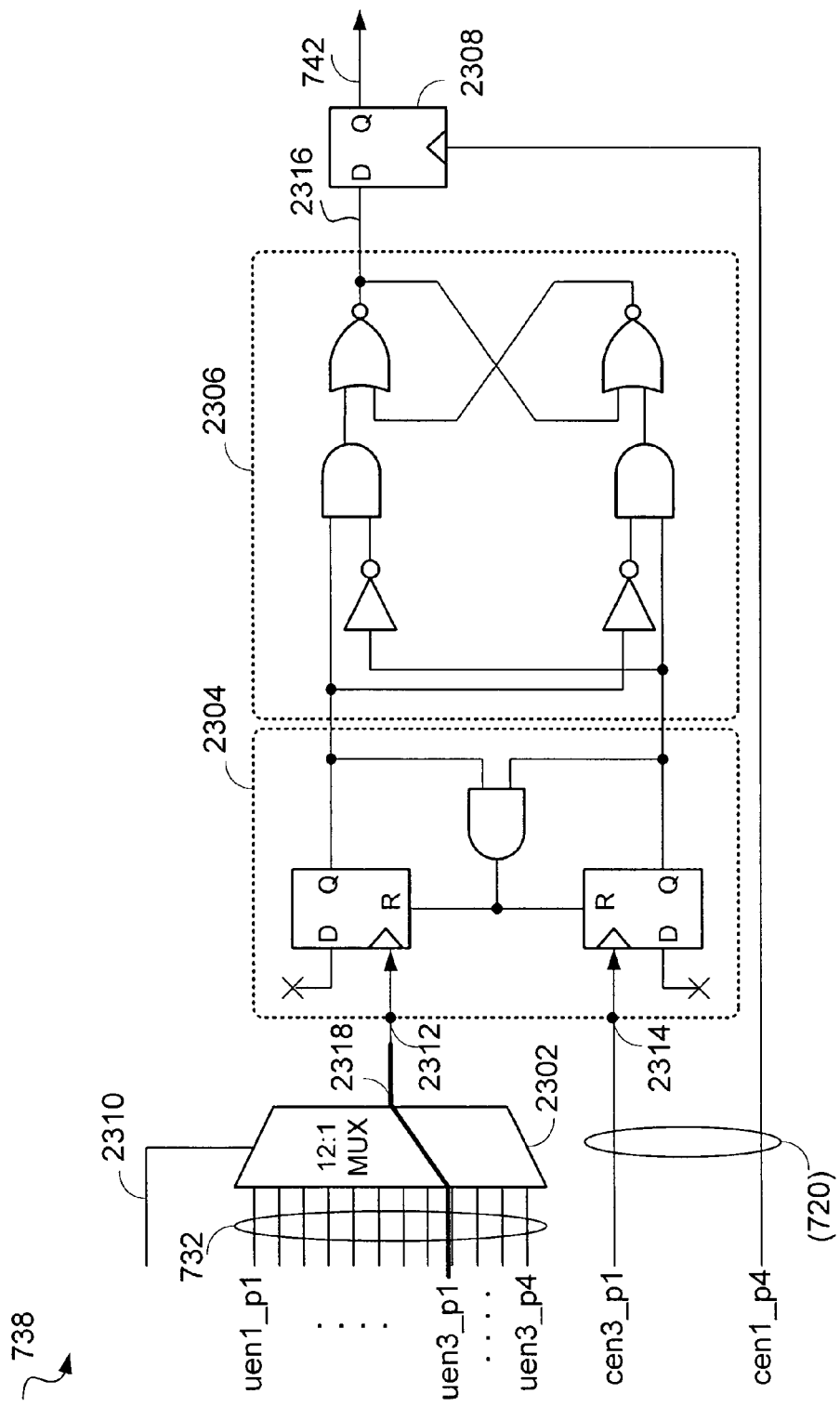
FIG. 23 shows a block diagram of an implementation of the Receive Phase Detector 738 of the Timing block 408 of FIG. 7.

FIG. 23 shows a block diagram of an implementation of the Receive Phase Detector 738, according to an embodiment of the invention. The Phase Detector 738 comprises a 12:1 Multiplexer 2302, a phase frequency detector 2304, an SR Latch 2306, and Re-Synch Flip Flop 2308. The inputs of the 12:1 Multiplexer 2302 are the twelve "output enable" signals 732 (uenX_pY, where X=1 . . . 3 and Y=1 . . . 4, see FIG. 7), and a phase selector bus 2310. The tightly coupled combination of the phase frequency detector 2304 and the SR Latch 2306 is a well known circuit that has two clock inputs 2312 and 2314 and a phase detector output 2316.

An output 2318 of the 12:1 Multiplexer 2302 is connected to a first input (i.e. the input 2312) of the phase frequency detector 2304. The second input (i.e. the input 2314) of the phase frequency detector 2304 is coupled to the clock enable signal cen3_p1 of the group of clock enable signals 720 (see FIG. 7). The output 2316 of the SR latch 2306 is coupled to the "D" input of the Re-Synch Flip Flop 2308 that is clocked by a retiming enable signal cen1_p4 (another of the clock enable signals 720). The "Q" output of the Re-Synch Flip Flop 2308 provides the TX/RX phase comparison signal (phase sample) 742 that is connected to the Receive Phase Alignment block 734.

Functionally, the Receive Phase Detector 738 provides a phase comparison between a representative clock signal from the recovered clock domain (see FIG. 3 for an explanation of clock domains) and a representative clock signal from the transmit clock domain. The recovered clock domain is represented by the selected "output enable" signal at the output 2318 of the 12:1 Multiplexer 2302, the selection being made through a four-bit control signal (the phase selector bus 2310). The transmit clock domain is represented by the (arbitrarily) selected "clock enable" signal cen3_p1 (input 2314) as a reference transmit clock phase. The phase detector output 2316 is retimed with the Re-Synch Flip Flop 2308 using the "clock enable" signal cen1_p4 in order for the phase sample 742 to be readily useable by the Receive Phase Alignment block 734 that implements the alignment algorithm, see FIG. 24 below.

The binary phase sample (742) indicates whether the signal at the input 2312 (the selected receive clock) is leading the signal at the input 2314 (that is ultimately derived from the transmit clock). A phase sample value of "1" indicates that the receive clock leads the transmit clock; a phase sample value of "0" indicates that the receive clock lags the transmit clock.

The Receive Phase Detector 738 can compare any selected clock 2318 against the reference transmit clock phase (the "clock enable" signal cen3_p1 at the input 2314). A four bit control word on the phase selector bus 2310 determines which of the set of "output enable" enable signals 732 is compared against the reference transmit clock phase.

The Receive Phase Detector 738 may be used in combination with a digital algorithm to program the depth of the asynchronous FIFO (308, FIG. 3) that is implemented in the Channel Slice 400 according to the preferred embodiment of the invention.

The phase detector output (the digital TX/RX phase comparison signal 742) is evaluated by the algorithm to establish a known phase relationship between any of the of the "output enable" phases 732 (as selected by the 12:1 Mux 2302, and the reference phase (here, the "clock enable" signal cen3_p1). The algorithm drives the Programmable Shift control signal 728 (FIG. 7) to change the relative phase between the recovered clock phase and the transmit clock phase. In this particular embodiment, the "clock enable" signal cen3_p1 has been chosen as the reference transmit clock phase for inputting at the input 2314 of the Phase Frequency detector 2304.

From the receive enable phases (the "output enable" signals 732 uenX_pY, X=1 to 3, Y=1 to 4), an arbitrary phase uen3_p1 may be chosen as the selected recovered clock phase and connected to the input 2312 (of the Phase Frequency detector 2304), as indicated by a heavy line through the 12:1 Mux 2302 in FIG. 23.

Figure 24:
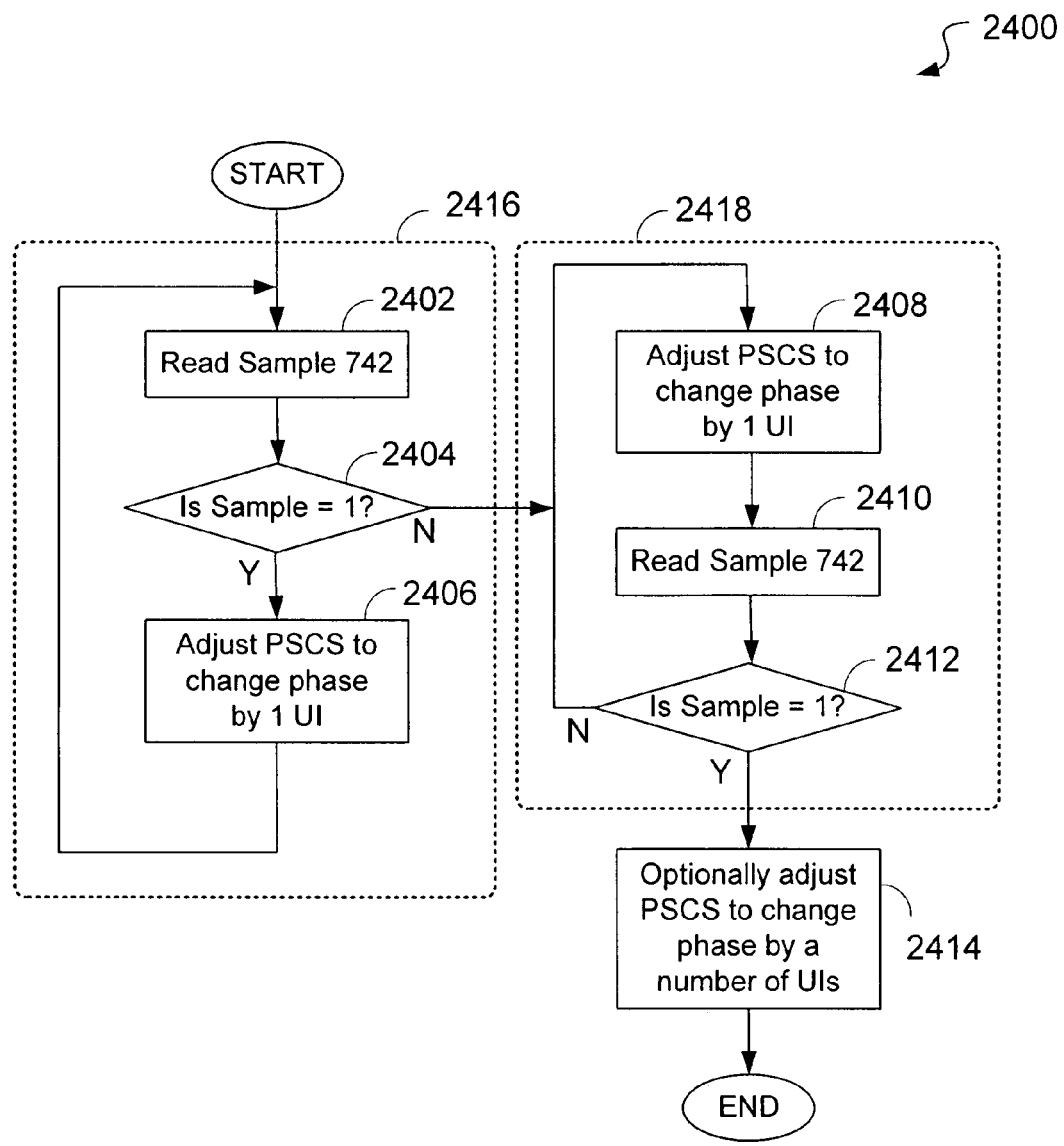
FIG. 24 is a flow chart 2400 of the algorithm that implements the functionality of the Receive Phase Alignment block 734 of the Timing block 408 of FIG. 7.

FIG. 24 is a flow chart 2400 of the algorithm that implements the functionality of the Receive Phase Alignment block 734 (FIG. 7) used during the initialization of the Channel Slice 400.

The algorithm comprises the steps:

"START";

2402 "Read Sample 742";

2404 "Is Sample=1?";

2406 "Adjust the Programmable Shift control signal 728 (PSCS) to change the phase of the Adjustable PLL 722 by one UI";

2408 "Adjust PSCS to change the phase of the Adjustable PLL 722 by one UI";

2410 "Read Sample 742";

2412 "Is Sample=1?";

2414 "Optionally adjust the Programmable Shift control signal 728 to change the phase of the Adjustable PLL 722 by a number of UIs"; and

"END"

The algorithm comprises two loops, a first loop 2416 (including the steps 2402 to 2406) followed by a second loop 2418 (including the steps 2408 to 2412), and the optional step 2414. This algorithm is almost identical to the algorithm of the Transmit Phase Alignment block 736 (FIG. 22).

In the first loop 2416, if the phase detector output (the step 2402 "Read sample 742") is "1" ("YES" from the step 2404 "Is Sample=1?"), the Programmable Shift control signal 728 is programmed to shift the receive clock phases 730 (rck_pY, where Y=1 . . . 4) in the Adjustable PLL 722 by one UI increment (the step 2406) until the phase detector output is "0" ("NO" from the step 2404). This shifting of the receive clocks will ripple down through the Receive Phase Generator 724 and will be reflected in the phase of the "output enable" signal uen3_p1. The aforementioned receive clock phases are shifted again by increments of one UI until the phase detector output is "1" ("YES" from the step 2412 of the second loop 2418). At that point, a known timing relationship has been established between uen3_p1 and cen3_p1 and it is then known that the rising edge of uen3_p1 is within one UI of the rising edge of cen3_p1.

The receive clock phases may then be shifted further in one UI increments (the step 2414 "Optionally adjust the Programmable Shift control signal 728 . . . ") until a specific desired phase alignment has been achieved and, in turn, the desired FIFO depth of the asynchronous FIFO has been set.

Note: The precise method of how the Adjustable PLL 722 is programmed using the Programmable Shift control signal 728 to produce 1 UI phase shifts depends on the implementation of the Adjustable PLL 722 which is beyond the scope of the present invention.

The Receive Phase Detector 738 may also be used to determine underflow or overflow conditions within the asynchronous FIFO. Once initialization of the FIFO depth has been established as described above, any other input phase of the recovered receive clock (the "output enable" signals 732) may be selected to monitor the drift within the asynchronous FIFO. By selecting another known input phase, and monitoring the phase detector output, it is possible to know when the recovered clock has drifted beyond a known point in the asynchronous FIFO, thus allowing for an overflow or underflow condition to be detected. The resolution of the detection circuit will be at least one UI.

The phases of the receive (recovered) clock signals 730 (rck_p1 to rck_p4) and thus their derivatives (the "output enable" signals 732 uenX_pY and the "latch enable" signals 733 lenX_pY), may accordingly be shifted with respect to the transmit clock signals 718 (tck_p1 to tck_p4) and their derivatives (the "clock enable" signals 720 cenX_pY).

As shown previously in FIG. 17, the 12 demultiplexed data bits tData[11:0] are stretched copies of 12 consecutive data bits from the high speed serial input din_s. Demultiplexing occurs in two stages, the 1:4 DEMUX 402, and the set of four 1:3 DEMUX blocks 1502 within which transparent latches (clocked by the "latch enable" signals 733) provide a storage element for the data bits tData[11:0]. Please take note that each of the data bits tData[11:0] is shown in FIG. 17 to be available for further processing for a period of up to 12 time slots, in staggered fashion.

It should be noted that the phases of the receive and transmit time frames (the 12 time slot frames 1702 and 1402, FIGS. 17 and 14 respectively) are not coincident, but may be shifted programmatically with respect to each other by using the functionality provided by the Receive Phase Detector 738 and the Receive Phase Alignment 734.

When no data merging occurs, the 12 data bits tData[11:0] are merely re-multiplexed, again in two stages, the set of four 3:1 MUX blocks 1504 and the 4:1 MUX 406 (see FIGS. 4 and 15). This is accomplished by feeding each bit independently and with minimal latency (gate delays only) through the corresponding Bit Slice 1506 into the corresponding 3:1 MUX 1504 where it is passed through a transmission gate to be sampled by the retiming flip flop 1550.

FIG. 25 shows in a Table 2 a summary of unique signal assignments in each Phase Slice 404 (see FIG. 15) with respect to a bit index "Z" (viz. the signals tData[Z] and dData [Z] in FIG. 19). The table 2 comprises 4 main columns:

an index column of "Z", Z=0 to 11 (indicating data bit tData[Z] for example);

a "Phase Slice 404" column;

a "1:3 Demux 1502" column;

a "Bit Slice 1506" column; and a "3:1 MUX 1504" column.

The entries in the "Phase Slice 404" column indicate the Phase Slice Number (#, see FIG. 4) within which the respective bit is stored and processed.

The "1:3 Demux 1502" column includes three sub columns, one for each of the three storage elements (latches) 1512, 1514, and 1516. The latch enable inputs of these latches (designated by reference numbers 1518, 1520, and 1522 respectively) are driven by specific "latch enable" signals (733), as indicated in the entries of each sub column, as illustrated in FIG. 17 above. For example, bit 0 (Z=0) is stored in the latch 1512 of the Phase Slice #1, using the "latch enable" signal len1_p1. Similarly, bit 11 (Z=11) is stored in the latch 1516 of the Phase Slice #4, using the "latch enable" signal len3_p4.

The "Bit Slice 1506" column includes two sub columns: a numbers column indicating which of three Bit Slices (within a Phase Slice) processes the respective data bit; and a column headed "(cenX_pY)" that lists the specific "clock enable" signal cenX_pY) (720) clocking the storage element 1818 (in the configuration 1804a) or 1820 (in the configuration 1804b), see FIGS. 18 and 19, that is specific to the respective Bit Slice 1506. Other storage elements of the Bit Slice 1506 are clocked by signals that are not specific to "Z". For example, bit 0 (Z=0) is clocked into the storage element 1818 with the "clock enable" signal cen2_p1. Similarly, bit 11 (Z=10) is clocked into the storage element 1818 with the "clock enable" signal cen1_p3. An exception is made in the Bit Slice #11 (Z=11, in the configuration 1804b) in which only one storage element (the D-type flip flop 1820) is provided in the Demux Data Alignment block 1804b; here the bit 11 is directly clocked into the storage element 1820 with the "clock enable" signal cen1_p4.

The "3:1 Mux 1504" column includes three sub columns, one for each of the three transmission gates 1536, 1538, and 1540. The control inputs of these transmission gates (designated by reference numbers 1542, 1544, and 1546 respectively) are driven by specific "clock enable" signals (720), as indicated in the entries of each sub column. For example, bit 0 (Z=0) is passed into the 3:1 MUX 1504 through the transmission gate 1536 of the Phase Slice #1, having its control input supplied by the "clock enable" signal cen1_p1. Similarly, bit 11 (Z=11) is passed through the transmission gate 1546 of the Phase Slice #4, having its control input supplied by the "clock enable" signal cen3_p4.

Having described the elements of the preferred embodiment of the invention in some detail, we can now review the realization of the three interrelated functional aspects: Serial Buffering (asynchronous FIFO), Data Extraction (Demultiplexing), and Data Insertion (Merge-multiplexing), that were generically described in FIG. 3 above.

In the Serial Buffering mode, the high speed bit stream "din_s" at the input 410 (FIG. 4) is first sampled in the four storage elements 502.1 to 502.4 (FIG. 5) of the 1:4 DEMUX block 402 using four phases of the receive clock (rck_p1 to rck_p4), as illustrated in the timing diagram 600 of FIG. 6. Each of the resulting four lower speed data streams din_p1 to din_p4 are then sampled further in the storage elements (1512, 1514, and 1516, FIG. 15) of each of the 1:3 DEMUX blocks 1502 (FIG. 16), using the twelve staggered latch enable signals "lenX_pY" that are generated from the four phases of the receive clock rck_p1 to rck_p4 (see the timing diagram 1400 of FIG. 14). The result are twelve staggered individual bit streams tData[0] to tData[11] as illustrated in the timing diagram 1700 of FIG. 17. The period of each of the data bits (for example bit "a0" in din_s) has been stretched by a factor of 12 (the corresponding bit "a0" in tData[0]). The receive clock that is generated in the adjustable PLL 722 (FIG. 7) tracks the incoming high speed bit stream "din_s", including possible jitter and wander. Hence, the bit streams tData[0] to tData[11] also track the timing of the incoming high speed bit stream "din_s".

In the Serial Buffering mode each of the bit streams tData [0] to tData[11] is passed straight through a corresponding Bit Slice (1506, FIG. 16), i.e. from the "0" input of the corresponding 2:1 Multiplexer 1802 (FIG. 18) to its output to become the bit streams oData[0] to oData[11] (the merged data bit streams 1604) respectively.

The high speed output bit stream dop_s (output 412, FIGS. 4 and 16) is formed in the two MUX stages (3:1 MUX 1504 and 4:1 MUX 406). Selection (passing through an enabled one of the transmission gates 1542, 1544, and 1546) and sampling by the storage element 1550 in each of the 3:1 MUX 1504 (FIG. 15) yields the lower speed output bit streams dop_p1 to dop_p4 which are then further multiplexed by the 4:1 MUX 406 into the high speed output bit stream dop_s.

Figure 26:
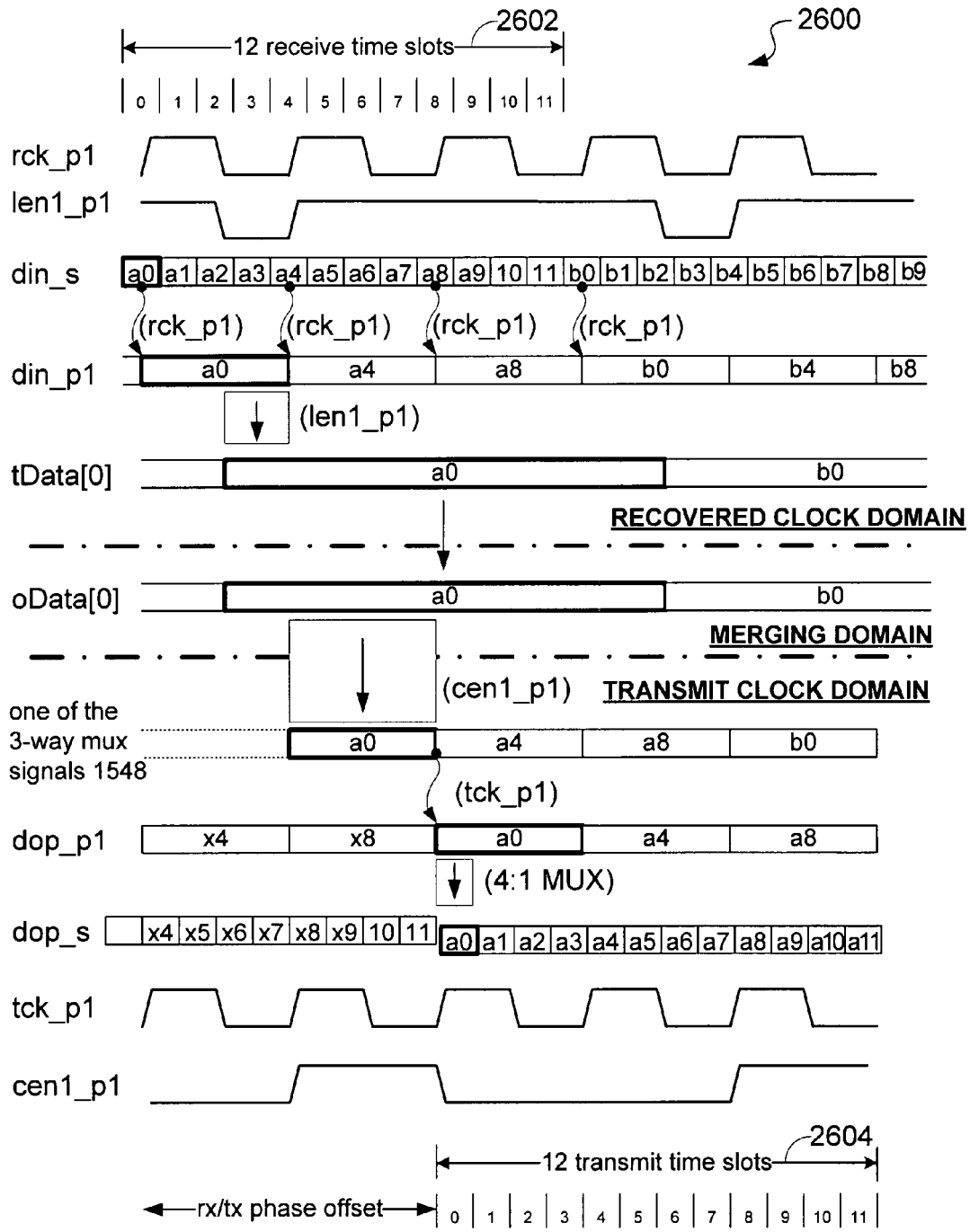
FIG. 26 is a timing diagram 2600 illustrating the operation of the Serial Buffering mode of the Channel Slice 400 of FIG. 4.

FIG. 26 is a timing diagram 2600 illustrating signal wave forms tracing, as an example, the course of a single bit from the high speed serial input 410 (din_s) to the high speed serial output 412 (dop_s).

The diagram 2600 is divided in three sections, an upper section above a first dot-dash line including selected signals in the recovered clock domain (see FIG. 3), a lower section below a second dot-dash line with signals in the transmit clock domain, and between the recovered clock domain and the transmit clock domain a merging domain.

Shown in the recovered clock domain are:
a scale 2602 indicating an arbitrary set of 12 receive time slots (UI);
the receive clock signal rck_p1;
the "length enable" signal len1_p1;
the high speed serial input signal din_s (aligned with the scale of receive time slots 2602);
the (lower speed) serial input data stream din_p1; and
the data bit stream tData[0].

The signals of the recovered clock domain illustrate the demultiplexing process as described above, specifically as it relates to an arbitrarily chosen bit "a0" (shown in heavy outline):

The serial input stream din_s is sampled by the (positive edge of the) receive clock signal rck_p1 at regular intervals, such that every fourth bit ("a0", "a4", "a8", etc), including the bit "a0" is sampled to form the lower speed data stream din_p1. By now, each of the sampled bits, including the bit "a0", has been stretched to a length of 4 UI.

Sampling of the serial input stream din_s by the other receive clock signals (rck_p2 to rck_p4) is not show; it results in a similar way in the other lower speed data streams din_p2 to din_p4, carrying bits from the other time slots.

The lower speed data stream din_p1 is then sampled with the "latch enable" signals to be latched in tData[X] streams as shown in FIG. 17. Specifically, the bit "a0" is latched with the latch enable signal len1_p1 in the data bit stream tData[0]. With tData[0], the bit "a0", has been stretched to a length of 12 UI.

Shown in the merging domain is the merged data bit stream oData[0].

As shown earlier, the stretched received bit "a0" that is stored in (appears in) tData[0] is simply selected (in the case of the Serial Buffer mode) in the 2:1 MUX 1802 (FIG. 18) to be passed through as the merged data output bit oData[0].

Shown in the transmit clock domain are:
one of the "3-way multiplexed bit" signals 1548 (FIG. 15);
the (lower speed) serial output bit stream dop_p1;
the high speed output bit stream dop_s;
the transmit phase (clock signal) tck_p1;
the "clock enable" signal cen1_p1; and
a scale 2604 indicating a set of 12 transmit time slots.

The high speed output bit stream dop_s is aligned with the scale of transmit time slots 2604.

The transmit time slots 2604 are shown offset by an arbitrary amount "rx/tx phase offset". This offset is controlled through the Rx/Tx Phase alignment mechanism described earlier (FIGS. 23 and 24).

The (stretched to 12 UI) merged data output bit oData[0] is then transferred into the transmit clock domain in a window defined by the "clock enable" signal cen1_p1 across the domain boundary to join the one of the "3-way multiplexed bit" signal 1548, i.e. the "3-way multiplexed bit" signal 1548 in the Phase Slice #1 (404.1). As described earlier, the "clock enable" signals cenX_pY (X=1 to 3, Y=1 to 4) drive the transmission gates 1542 to 1546 in each 3:1 MUX block 1504) to allow a selected oData[X] signal to be passed into the corresponding "3-way multiplexed bit" signal 1548 in each respective MUX block 1504. Thus, the bits "a4" and "a8" are also passed into the "3-way multiplexed bit" signal 1548 from their respective oData[Z] streams in their own transfer windows (not shown).

The "3-way multiplexed bit" signal 1548 is sampled with the positive edge of the transmit clock tck_p1 in the retiming flip flop 1550 which outputs the (lower speed) serial output bit stream dop_p1.

The (lower speed) serial output bit stream dop_p1 is then multiplexed further in the 4:1 MUX 406 (FIG. 4) to form the high speed output bit stream dop_s.

Figure 27:
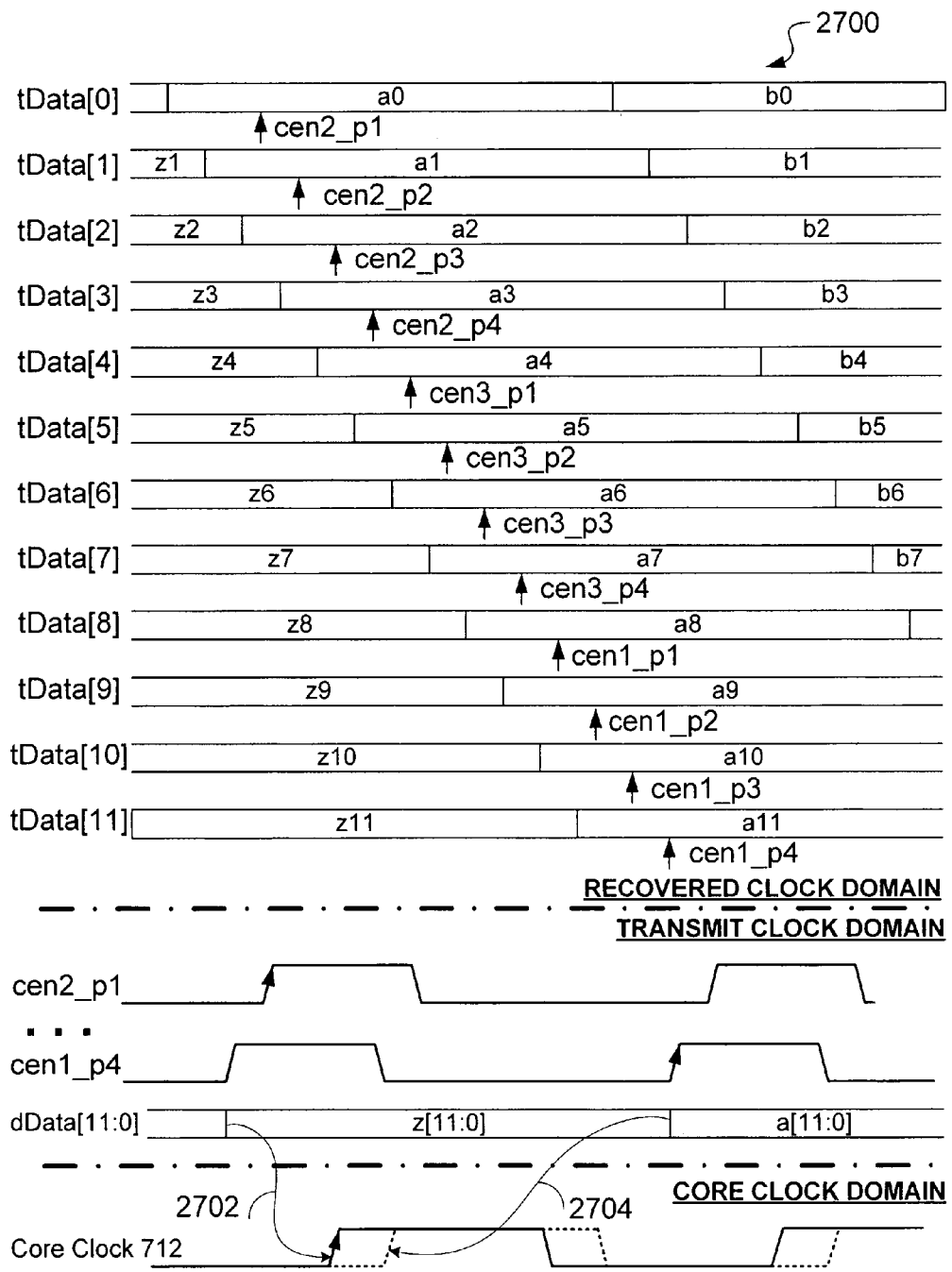
FIG. 27 is a timing diagram 2700 that illustrates the operation of the Data Extraction mode of the Channel Slice 400 of FIG. 4.

FIG. 27 is a timing diagram 2700 that illustrates the Data Extraction mode in which the demultiplexed the data streams 1602 (see FIGS. 16 and 17) tData[Z] are converted to the parallel data words dData[11:0] for inputting to the Core 204 (see FIG. 2) over the Data Extraction highway 218.

The timing diagram 2700 is divided in three sections, an upper section above a first dot-dash line including selected signals in the recovered clock domain, a middle section including exemplary signals in the transmit clock domain, and a lower section below a second dot-dash line indicating the core clock domain.

Shown in the recovered clock domain are the individual data bit streams tData[0] to tData[11] which are demultiplexed as shown in the previous FIG. 17. As shown in the diagram, each of the data bit streams tData[Z] (Z=0 to 11) carries a sequence of corresponding stretched bits z[Z], a[Z], b[Z], etc, whose bit boundaries are staggered by one time slot (Unit Interval) as shown in the previous FIG. 17.

Also illustrated are exemplary sampling points (arrows) along each of the data bit streams tData[0] to tData[11], indicating a "clock enable" signal cenX_pY (X=1 to 3, Y=11 to 4) at which sampling point the corresponding stretched data bit may be sampled and stored into the corresponding Demux Data Alignment block 1804 (FIG. 18). For example, the positive edge of the "clock enable" signal cen1_p1 is used to sample the data bit stream tData[0] (Z=0), as listed in the Table 2 (FIG. 25).

Shown in the transmit clock domain are the "clock enable" signals cen2_p1 and cen1_p4. Because the bit transitions in the set of data bit streams tData[Z] (in the recovered clock domain) are skewed in the same way as the sampling points that are given by the corresponding "clock enable" signals (in the transmit clock domain), the phase offset between the two domains can vary with the jitter of the received signal, as well as be programmed and adjusted using the Rx/Tx Phase Alignment as described above by which the initial depth of the adjustable FIFO is set. After sampling as described, de-skewing of the demultiplexed data is accomplished by double buffering, that is resampling using the "clock enable" signal cen1_p4 into the storage elements 1820 in each of the Data Alignment blocks 1804a.

Thus, after sampling (and double buffering in the cases of Z=0 to 10) in the Data Alignment blocks 1804, the twelve-bit parallel demultiplexed data words "dData[11:0]" (also shown in the transmit clock domain of the timing diagram 2700) are available for outputting to the core over the Data Extraction highway 414 (FIGS. 4 and 15).

Shown in the core clock domain of the timing diagram 2700 is a typical core clock 712. The phase of the core clock 712 may be programmatically adjusted with respect to the clock and "clock enable" signals of the transmit clock domain, as described earlier (see FIGS. 21 and 22). As illustrated, the positive transition of the core clock 712 may be used to sample the demultiplexed data words "dData[11:0].

Shown crossing from the in the transmit clock domain into the core clock domain are arrows 2702 and 2704 symbolizing set-up time and hold-time restrictions that may be imposed by the technology used in the core circuitry. The phase of the core clock 712 should thus be adjusted (relative to the transmit clock) such that the minimum set-up (2702) and hold (2704) times are observed, as indicated in the diagram with dotted lines. This provides flexibility in accommodating delays caused by circuit tracks and circuitry used in coupling the programmable FIFO to the core circuitry.

Figure 28:
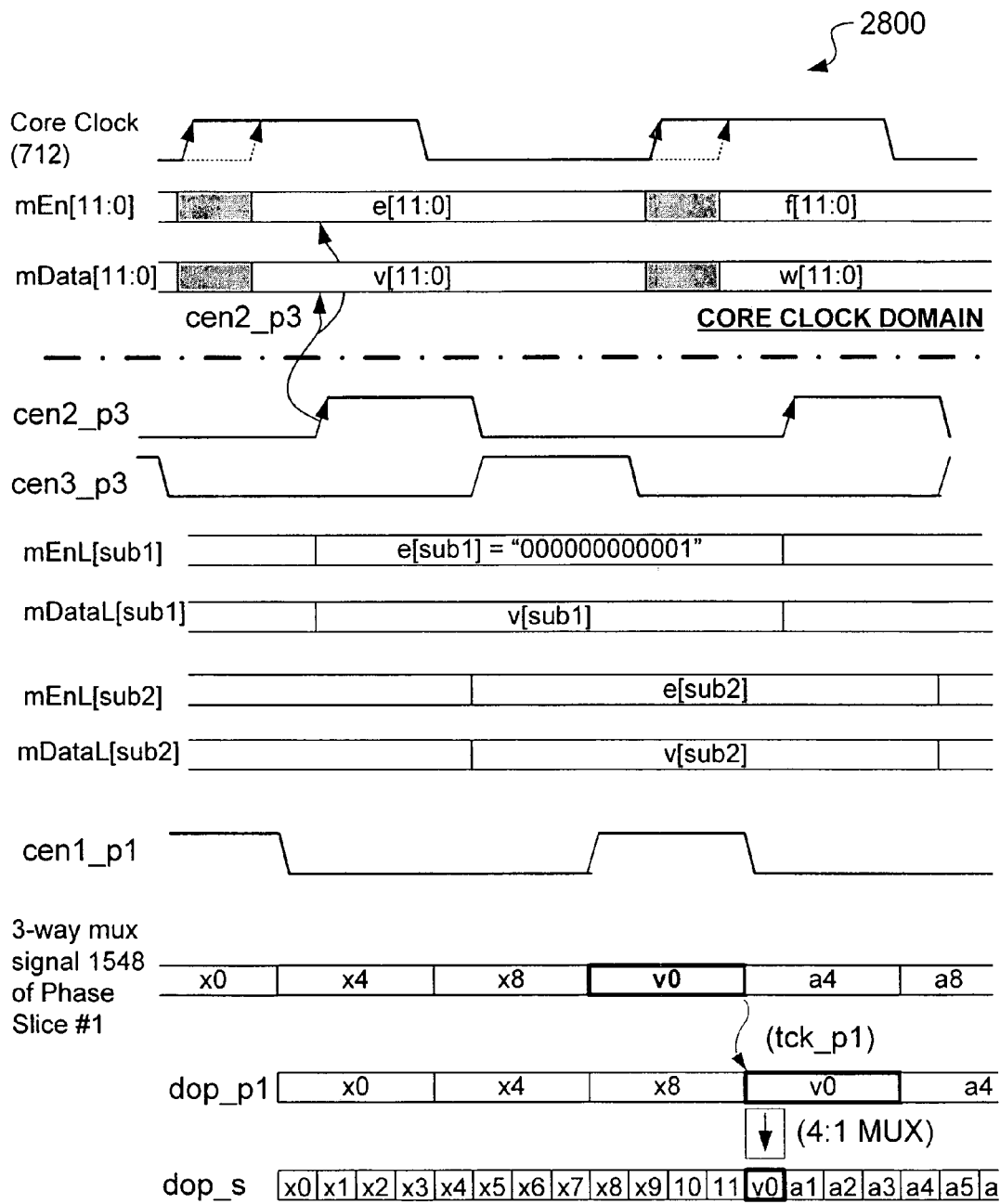
FIG. 28 is a timing diagram 2800 that illustrates the operation of the Data Insertion mode of the Channel Slice 400 of FIG. 4.

FIG. 28 is a timing diagram 2800 that illustrates the Data Insertion mode in which data from the core may be converted from parallel (mData[11:0] on the Data Insertion Highway 416) to the high speed output bit stream dop_s for transmission over the high speed serial output 412. Furthermore, bit wise control over the insertion (merging) process is possible with the merge-enable control words "mEn[11:0]" received over the Merge Control Highway 418. Thus dejittered data bits received from the high speed serial input (tData[o] to tData[11]) can be freely and accurately merged (mixed or interleaved) with data bits from the core (mData[11:0]).

The timing diagram 2800 is divided in two sections, an upper section above a dot-dash line including selected exemplary signals in the core clock domain a lower section including exemplary signals in the transmit clock domain.

The exemplary signal waveforms shown in the core clock domain section of the diagram include:
  the core clock 712 which is typically phase aligned with the transmit clock phases as described earlier (see FIGS. 21 and 22). Two slightly shifted phases of the Core Clock 712 are shown, to account for possible delays in the circuit implementation.
  the merge enable control words "mEn[11:0]" presented by the Core 204 over the Merge Control Highway 418, successively labeled "e[11:0], f[11:0], etc. Uncertainty periods when the control words may be updated by the core are shown in gray.
  the merged data words "mData[11:0]" from the Core 204 (presented over the Data Insertion Highway 416), labeled successively v[11:0], w[11:0], etc. Uncertainty periods when the merged data words may be updated by the core are shown in gray.

All bits of both, mEn[11:0] and mData[11:0] are periodically sampled with the (transmit clock domain) "clock enable" signal cen2_p3, and stored in the edge triggered storage elements 1826 (mEn) and 1822 (mData) of the Bit Slices 1506 (see FIGS. 15 and 19), clocked on the positive edge of the "clock enable" signal cen2_p3.

The exemplary signal waveforms shown in the transmit clock domain section of the diagram include:
  the "clock enable" signal cen2_p3, its clocking edges indicated with arrows;
  the "clock enable" signal cen3_p3 which is used to latch the output of the storage elements 1822 and 1826 in latches 1824 and 1828 respectively, in the case of enable and data bits 3 and 4. This delays the validity period of these two bits by 4 UI, which is necessary to avoid conflict with the sampling windows in the 3:1 MUX 1504;

the latched merge enable and data signals in two sub sets, sub set 1 (sub1) including bits 0 to 2 and bits 5 to 11, and sub set 2 (sub2) including bits 3 and 4:

mEnL[sub1], the stored merge enable control words mEn[11:5 and 2:0];

mDataL[sub I] the stored merged data words mEn[11:5 and 2:0];

mEnL[sub2], the stored merge enable control words mEn[4:3]; and mDataL[sub2] the stored merged data words mEn[4:3].

As an example, the merging of a single mData bit (bit "v0") is shown, which is accomplished by setting the concurrent mEn control word to the binary value "000000000001". This bit (mEn[0]), being set to "1" (the signal link 1814 from the Merge Enable Alignment block 1808) causes the 2:1 Multiplexer 1802 (FIG. 18) of the bit slice 1506 that processes bit 0, to select the output of the Merge Data Alignment block 1806 instead of the tData[Z] (Z=0) bit.

Further shown in the transmit clock domain section of the diagram are:

the "clock enable" signal cen1_p1, as an example. The signal cen1_p1 is used to enable the transmission gate 1542 (FIG. 15) of the 3:1 MUX 1504 in the Phase Slice #1 (404.1, FIG. 4), to allow bit 0 to pass.

the 3-way mux signal 1548 of the Phase Slice #1, where three bits are multiplexed. This signal shows the mData [0] bit "v0" in place of the forwarded tData[0] bit (a0), cf. FIG. 26; and the high speed output bit stream dop_s, as in FIG. 26 forwarding all received bits with the exception of the "a0" bit which has been replaced by the inserted mData [0] bit "v0".

In a similar way, not shown in the timing diagram, one, more, or all bits may be inserted from individual merged data words "mData[11:0]" into the outgoing high speed serial bit stream dop_s, by setting the corresponding bit(s) in the concurrent merge enable control words "mEn[11:0]", thus replacing respective tData[Z] bits.

SUMMARY

The Channel Slice 400 performs a number of related functions:

it acts as an asynchronous FIFO between the high speed serial input 410 and the high speed serial output 412;

it acts as a serial to parallel converter with clock alignment, between the high speed serial input 410 and the Data Extraction highway 414 to the core; and it acts as a parallel to serial converter from the Data Insertion Highway 416 to the high speed serial output 412.

It furthermore permits bit-wise control (using bits from the Merge Control Highway 418) in merging the signal from the high speed serial input 410 and the signal from the Data Insertion Highway 416 into the high speed serial output 412.

This multiple functionality is provided with a very small amount of circuitry, most of which may be implemented in a low-power technology such as CMOS. In the preferred embodiment of the invention the following blocks are implemented in a bipolar current-mode-logic (CML) technology:

the 1:4 DEMUX 402;
the 4:1 MUX 406;
Core Clock generator 702*a*;
the Clock Distribution 702*b*; and
the Transmit Clock Generator 714.

Blocks that may be implemented in a high-speed low-power CMOS circuit technology are:

the Phase Slices 404;
the Transmit Phase generator 716;
the Receive Phase generator 724;
the Latch Enable Generator 726;
the Receive Phase Detector 738; and
the Transmit Phase Detector 740.

CML-to-CMOS converters and CMOS-to-CML converters (not shown in the Figures) are inserted in the signal paths as needed to connect circuitry of one technology to the other. Both circuit technologies may coexist on a single substrate, allowing the entire circuit to be manufactured on a single die.

The selection of the two-stage demultiplexing/multiplexing scheme, composed of 1:M (M=3) and 1:N (N=4) stages is convenient in meeting the M×N (=12)-bit format requirement of the present application. However, other two-stage multiplexing schemes may be more advantageous in other applications. For example if a 16-bit format were to be addressed, demultiplexing in two stages with M=4 and N=4 (a 1:4 first stage and a 1:4 second stage) may be advantageous.

The preferred embodiment of the invention has been described in the context of its application in a computer memory system. The scope of the invention includes other applications that may benefit from a low-latency asynchronous FIFO for buffering a serial bit stream with the possibility of extracting or inserting parallel data into the bit stream.

Although specific embodiments of the invention have been described in detail, it will be apparent to one skilled in the art that variations and modifications to the embodiments may be made within the scope of the following claims.

What is claimed is:

1. A first-in-first-out (FIFO) circuit for buffering of a high speed input bit stream of data bits (din_s), including:
    a 1:M demultiplexer for generating M lower speed serial input data streams (din_p1 to din_pM), the lower speed being M times slower than a speed of the high speed input bit stream, speed each lower speed serial input data stream carrying a distinct first subset of the data bits;
    a first plurality M of 1:N demultiplexers, each for generating N first data bit streams each first data bit stream carrying a distinct second subset of the first subset of the data bits;
    a second plurality of M times N bit slices, each bit slice forwarding the first data bit streams into second data bit streams;
    a third plurality M of N:1 multiplexers, each for combining N second data bit streams of the second subset into a (lower speed) serial output bit stream (dop_p1 to dop_pM); and
    an M:1 multiplexer for combining the (lower speed) serial output bit streams into a high speed output bit stream (dop_s).

2. The FIFO as described in claim 1, wherein M=4 and N=3.

3. The FIFO as described in claim 1, further comprising a timing circuit (408) that provides a multi phase receive clock signal (rck_p1 to rck_pM); and
    wherein the 1:M demultiplexer comprises a set of M edge triggered flip flops, each being clocked by a phase of the multi phase receive clock signal to periodically store one bit from the high speed input bit stream.

4. The FIFO as described in claim 3, wherein the timing circuit further provides a multi phase "latch enable" signal (lenX_pY); and
    wherein the 1:N demultiplexer comprises a set of N storage elements, each being enabled by a phase of the multi phase "latch enable" signal to periodically store one bit from one the lower speed serial input data streams.

5. The FIFO as described in claim 4, wherein the storage elements are transparent latches (1512).

6. The FIFO as described in claim 4, wherein the timing circuit further provides a multi phase "clock enable" signal (cenX_pY); and
wherein the N:1 multiplexer comprises a set of N transmission gates (1536), each being enabled by a phase of the "clock enable" signal to periodically pass one data bit of the second subset into the (lower speed) serial output bit stream.

7. The FIFO as described in claim 6, wherein the timing circuit further provides a multi phase transmit clock signal (tck_pM) from which the multi phase "clock enable" signal is generated.

8. The FIFO as described in claim 7, wherein the N:1 multiplexer further comprises a retiming flip flop (1550) for retiming the (lower speed) serial output bit stream, the retiming flip flop being clocked by a phase of the multi phase transmit clock signal.

9. The FIFO as described in claim 7, wherein the multi phase transmit clock signal is generated from a reference clock of a frequency that is related to the bit rate of the high speed input bit stream by a ratio of 1:R.

10. The FIFO as described in claim 9, wherein the ratio R equals 1:2.

11. The FIFO as described in claim 9, wherein each bit slice comprises a demux data alignment circuit (1804) for buffering the first data bit stream and outputting the buffered data bit stream on a Data Extraction highway (dData).

12. The FIFO as described in claim 11, wherein the demux data alignment circuit comprises one or more first clocked storage devices to insert a delay from the first data bit stream to the output of the demux data alignment circuit.

13. The FIFO as described in claim 12, wherein the first clocked storage devices in each bit slice are clocked individually with a phase of the multi phase "clock enable" signal chosen such that a parallel word of M times N bits is periodically output to the Data Extraction highway.

14. The FIFO as described in claim 9, wherein each bit slice further comprises:
a 2:1 multiplexer (1802);
a merge data alignment circuit (1806) having a merge data input and an aligned merge data output;
and a merge enable alignment circuit (1808) having a merge enable input and an aligned merge enable output;
wherein the 2:1 multiplexer selectively, under control of the aligned merge enable output, forwards either the first data bit stream or the aligned merge data output to the second data bit stream.

15. The FIFO as described in claim 14, wherein the merge data input receives a data bit from a Data Insertion highway (mData) and the merge enable input receives control bit from a Merge Control Highway (mEn).

16. The FIFO as described in claim 15, wherein the merge data alignment circuit and the merge enable alignment circuit in each bit slice each comprise one or more second clocked storage devices to insert a delay between their respective inputs and outputs.

17. The FIFO as described in claim 16, wherein the last of the second clocked storage devices in each bit slice are clocked individually with a phase of the multi phase "clock enable" signal chosen such that a parallel data word of M times N bits that is periodically input to the M times N merge data alignment circuits from the Data Insertion highway and the Merge Control Highway become substantially aligned with the first data bit streams.

18. A memory buffer serving a plurality C of serial bit lanes including a plurality C of channel slices (200), each channel slice serving one serial bit lane and comprising a first-in-first-out (FIFO) circuit for buffering of a high speed input bit stream of data bits (din_s), including:
a 1:M demultiplexer for generating M lower speed serial input data streams (din_p1 to din_pM), the lower speed being M times slower than a speed of the high speed input bit stream, each lower speed serial input data stream carrying a distinct first subset of the data bits;
a first plurality M of 1:N demultiplexers, each for generating N first data bit streams each first data bit stream carrying a distinct second subset of the first subset of the data bits;
a second plurality of M times N bit slices, each bit slice forwarding the first data bit streams into second data bit streams;
a third plurality M of N:1 multiplexers, each for combining, N second data bit streams of the second subset into a (lower speed) serial output bit stream (dop_p1 to dop_pM); and
an M:1 multiplexer for combining the (lower speed) serial output bit streams into a high speed output bit stream (dop_s).

19. The memory buffer described in claim 18, wherein:
the FIFO further comprises a timing circuit (408) that provides a multi phase receive clock signal (rck_p1 to rck_pM) and a multi phase "latch enable" signal (lenX_pY);
the 1:M demultiplexer comprises a set of M edge triggered flip flops, each being clocked by a phase of the multi phase receive clock signal to periodically store one bit from the high speed input bit stream; and
the 1:N demultiplexer comprises a set of N storage elements, each being enabled by a phase of the multi phase "latch enable" signal to periodically store one bit from one the lower speed serial input data streams.

20. The memory buffer described in claim 19, wherein:
the timing circuit further provides a multi phase "clock enable" signal (cenX_pY), a multi phase transmit clock signal (tck_pM) from which the multi phase "clock enable" signal is generated, the multi phase transmit clock signal being generated from a reference clock of a frequency that is related to the bit rate of the high speed input bit stream by a ratio of 1:R; and
the N:1 multiplexer comprises a set of N transmission gates (1536), each being enabled by a phase of the "clock enable" signal to periodically pass one data bit of the second subset into the (lower speed) serial output bit stream.

21. The memory buffer described in claim 20, wherein each Channel Slice further comprises:
a Data Extraction highway (dData);
a Data Insertion highway (mData); and
a Merge Control Highway (mEn),
and wherein each bit slice comprises:
a demux data alignment circuit (1804) for the purpose of buffering the first data bit stream and outputting it on the Data Extraction highway;
a 2:1 multiplexer (1802);
a merge data alignment circuit (1806) having a merge data input connected to the Data Insertion highway and an aligned merge data output;
and a merge enable alignment circuit (1808) having a merge enable input connected to the Merge Control highway, and an aligned merge enable output;

the 2:1 multiplexer selectively, under control of the aligned merge enable output, forwarding either the first data bit stream or the aligned merge data output to the second data bit stream.

22. The memory buffer described in claim 21, wherein the demux data alignment circuit comprises one or more first clocked storage devices to insert a delay from the first data bit stream to the output of the demux data alignment circuit, the first clocked storage devices in each bit slice being clocked individually with a phase of the multi phase "clock enable" signal chosen such that a parallel word of M times N bits is periodically output to the Data Extraction highway.

23. The memory buffer described in claim 22, wherein the merge data alignment circuit and the merge enable alignment circuit in each bit slice each comprise one or more second clocked storage devices to insert a delay between their respective inputs and outputs, the second clocked storage devices in each bit slice being clocked individually with a phase of the multi phase "clock enable" signal chosen such that a parallel data word of M times N bits that is periodically input to the M times N merge data alignment circuits from the Data Insertion highway become substantially aligned with the first data bit streams.

24. A method for buffering a high speed input bit stream of data bits (din_s) performed in a memory buffer, including:
   a first step of demultiplexing the input bit stream into M lower speed serial input data streams (din_p1 to din_pM), the lower speed being M times slower than a speed of the high speed input bit stream, each lower speed serial input data stream carrying a distinct first subset of the data bits;
   a second step of demultiplexing each of the M lower speed serial input data streams into N first data bit stream each first data bit stream carrying a distinct second subset of the first subset of the data bits;
   a step of bit slice processing comprising the step of forwarding the first data bit stream into the second data bit stream;
   a first step of combining each group of N second data bit streams of the second subset into a serial output bit stream (dop_p1 to dop_pM); and
   a second step of combining the (lower speed) serial output bit streams into a high speed output bit stream (dop_s).

25. The method as described in claim 24, wherein M=4 and N=3.

26. The method as described in claim 24, the first step of demultiplexing further including:
   generating a multi phase receive clock signal (rck_p1 to rck_pM); and
   periodically storing one bit from the input bit stream into one of M edge triggered flip flops, each flip flop being clocked by a phase of the multi phase receive clock signal.

27. The method as described in claim 26, the second step of demultiplexing further including:
   generating a multi phase "latch enable" signal (lenX_pY); and
   periodically storing one bit from each lower speed serial input data stream into one of N storage elements, each storage element being enabled by a phase of the multi phase "latch enable" signal.

28. The method as described in claim 27, the first step of combining further including:
   generating a multi phase "clock enable" signal (cenX_pY); and
   periodically passing one bit data bit of the second subset through a transmission gate into the (lower speed) serial output data stream, each transmission gate being enabled by a phase of the multi phase "clock enable" signal.

29. The method as described in claim 28, the step of generating a multi phase "clock enable" including generating a multi phase transmit clock signal (tck_pM) as the source of the multi phase "clock enable" signal.

30. The method as described in claim 29, the first step of combining further including retiming the (lower speed) serial output data stream in a retiming flip flop that is clocked by a phase of a multi phase transmit clock signal.

31. The method as described in claim 29, wherein the step of generating a multi phase transmit clock signal (tck_pM) includes synchronizing the multi phase transmit clock signal with a reference clock of a frequency that is related to the bit rate of the high speed input bit stream by a ratio of 1:R.

32. The method as described in claim 31, including selecting the ratio R equals 1:2.

33. The method as described in claim 31, the step of bit slice processing further comprising:
   buffering the first data bit stream in an alignment buffer; and
   outputting the buffered data bit stream on a Data Extraction highway (dData).

34. The method as described in claim 33, wherein the step of buffering comprises one or more steps of delaying the first data bit stream.

35. The method as described in claim 34, wherein the first of said one or more steps of delaying includes choosing a phase of the multi phase "clock enable" signal such that a parallel word of M times N bits is periodically output to the Data Extraction highway.

36. The method as described in claim 31, the step of bit slice processing further comprising:
   aligning a merged data bit;
   aligning a merge enable bit; and
   provided the aligned merge enable bit is "0", then forwarding the first data bit stream;
   provided the aligned merge enable bit is other than "0", forwarding the aligned merge data bit to the second data bit stream.

37. The method as described in claim 36, wherein the merged data bit is received from a Data Insertion highway (mData), and the merge enable bit is received from a Merge Control Highway (mEn).

38. The method as described in claim 37, wherein the each step of aligning comprises one or more steps of delaying.

39. The method as described in claim 37, wherein the last of the one or more steps of delaying includes individually choosing a phase of the multi phase "clock enable" signal such that parallel data words of M times N bits, comprising the merged data bits and the merge enable bits, which are periodically input from the Data Insertion highway and from the Merge Control highway, become substantially aligned with the first data bit streams.

* * * * *